US011899190B2

(12) United States Patent  
Kitada et al.

(10) Patent No.: US 11,899,190 B2  
(45) Date of Patent: Feb. 13, 2024

(54) ZOOM LENS SYSTEM, IMAGE CAPTURE DEVICE, AND CAMERA SYSTEM

(71) Applicant: Panasonic Intellectual Property Management Co., Ltd., Osaka (JP)

(72) Inventors: Takahiro Kitada, Osaka (JP); Yuka Kudo, Hyogo (JP); Masafumi Sueyoshi, Kanagawa (JP); Jindong Li, Fujian (CN)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 286 days.

(21) Appl. No.: 17/243,984

(22) Filed: Apr. 29, 2021

(65) Prior Publication Data  
US 2021/0356723 A1 Nov. 18, 2021

(30) Foreign Application Priority Data

May 15, 2020 (JP) ................................. 2020-085568

(51) Int. Cl.  
*G02B 15/14* (2006.01)  
*G02B 13/18* (2006.01)  
*G02B 13/02* (2006.01)

(52) U.S. Cl.  
CPC ..... *G02B 15/145121* (2019.08); *G02B 13/02* (2013.01); *G02B 13/18* (2013.01)

(58) Field of Classification Search  
CPC .......... G02B 15/145; G02B 15/1451; G02B 15/163; G02B 13/009; G02B 13/0045; G02B 13/04; G02B 13/22; G02B 13/02; G02B 9/60; G02B 9/64; G02B 1/041; G02B 3/00; G02B 27/0955; G02B 27/095; G03B 2205/00; G03B 2205/0046  
See application file for complete search history.

(56) References Cited

U.S. PATENT DOCUMENTS

2012/0092777 A1* 4/2012 Tochigi .......... G02B 15/145121  
359/684  
2013/0242170 A1* 9/2013 Kurioka ............. G02B 15/1461  
359/683

FOREIGN PATENT DOCUMENTS

JP 2006-178244 7/2006

* cited by examiner

*Primary Examiner* — Marin Pichler  
*Assistant Examiner* — Justin W. Hustoft  
(74) *Attorney, Agent, or Firm* — Wenderoth, Lind & Ponack, L.L.P.

(57) ABSTRACT

A zoom lens system includes: a first lens group having positive power; a second lens group having negative power; a third lens group having positive power; a fourth lens group having negative power; and a fifth lens group having positive power. The first lens group is made up of a single lens. The second lens group is made up of four lenses. The zoom lens system is configured to zoom from a wide-angle end toward a telephoto end such that the fifth lens group does not move but the first to fourth lens groups move to change intervals between the lens groups.

12 Claims, 10 Drawing Sheets

ZOOM LENS SYSTEM, IMAGE CAPTURE DEVICE, AND CAMERA SYSTEM

CROSS-REFERENCE TO RELATED APPLICATIONS

This application is based on, and claims the benefit of foreign priority to, Japanese Patent Application No. 2020-085568 filed on May 15, 2020, the entire disclosure of which is hereby incorporated by reference.

TECHNICAL FIELD

The present disclosure relates to a zoom lens system with the ability to compensate for various types of aberrations sufficiently, and also relates to an image capture device and camera system including such a zoom lens system.

BACKGROUND ART

JP 2006-178244 A discloses a zoom lens system including: a first lens group I having positive refractive power; a second lens group II having negative refractive power; a third lens group III having positive refractive power; a fourth lens group IV having negative refractive power, and a fifth lens group V having positive refractive power, where these first through fifth lens groups I-V are arranged in this order such that the first lens group I is located closer to an object than any other lens group II-V is and that the fifth lens group V is located closer to an image than any other lens group I-IV is. The zoom lens system performs zooming from a wide-angle end toward a telephoto end by moving the second lens group II in a direction pointing from the object end toward the image end with the first lens group I fixed and compensates for an aberration involved with zooming by moving the third lens group III, the fourth lens group IV, and the fifth lens group V.

SUMMARY

The present disclosure provides a zoom lens system with the ability to compensate for various types of aberrations sufficiently and also provide an image capture device and camera system including such a zoom lens system.

A zoom lens system according to an aspect of the present disclosure includes: a first lens group having positive power; a second lens group having negative power; a third lens group having positive power; a fourth lens group having negative power; and a fifth lens group having positive power. The first, second, third, fourth, and fifth lens groups are arranged in this order such that the first lens group is located closer to an object than any of the second, third, fourth, or fifth lens group is, and that the fifth lens group is located closer to an image than any of the first, second, third, or fourth lens group is. The first lens group is made up of a single lens. The second lens group is made up of four lenses. While the zoom lens system is zooming from a wide-angle end toward a telephoto end during a shooting session, the fifth lens group does not move but the first to fourth lens groups move to change intervals between all of the first, second, third, fourth, and fifth lens groups.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION

Figure 1:
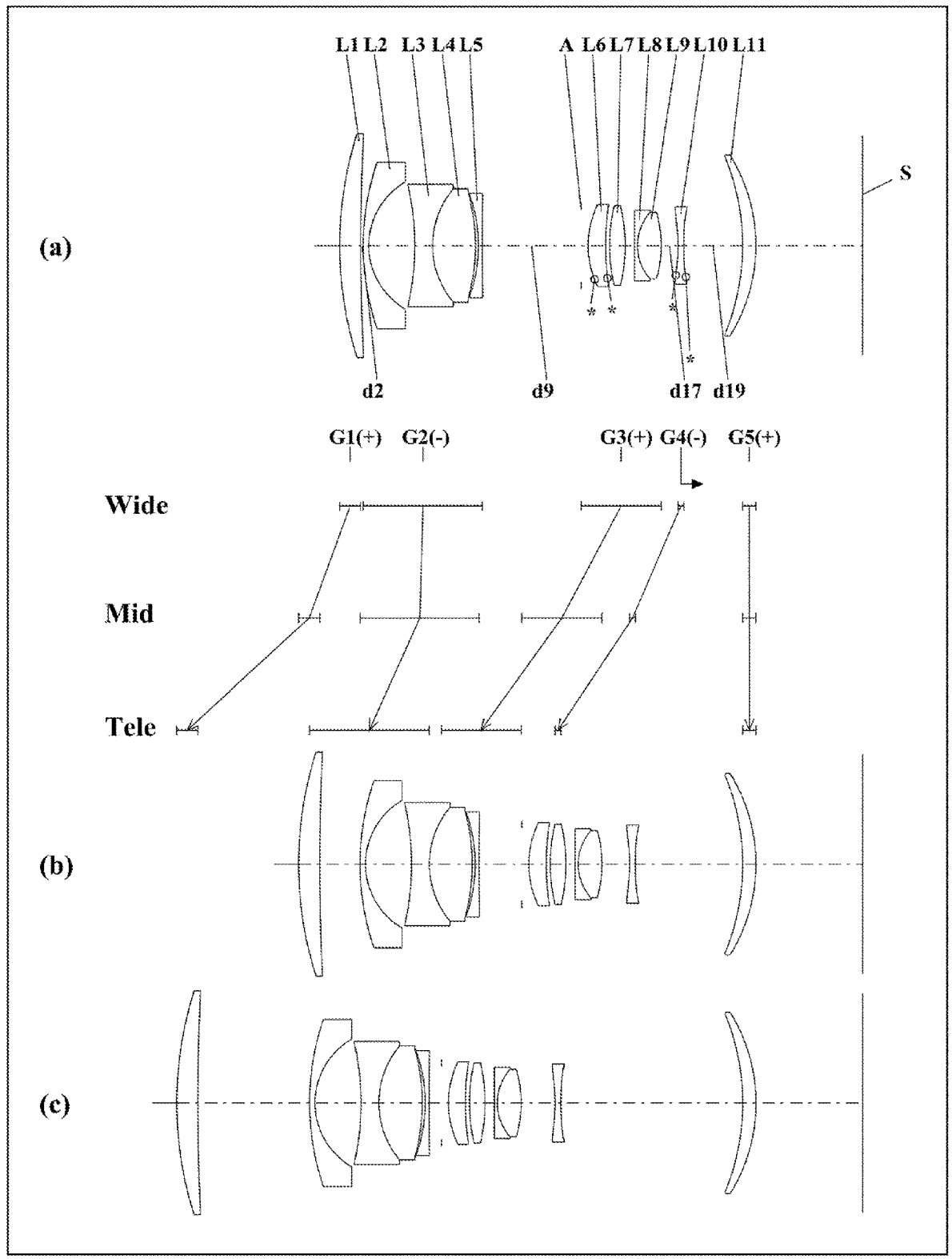
FIG. 1 illustrates lens arrangements showing what state a zoom lens system according to a first embodiment (corresponding to a first example of numerical values) assumes at an infinity focus point.
Figure 2:
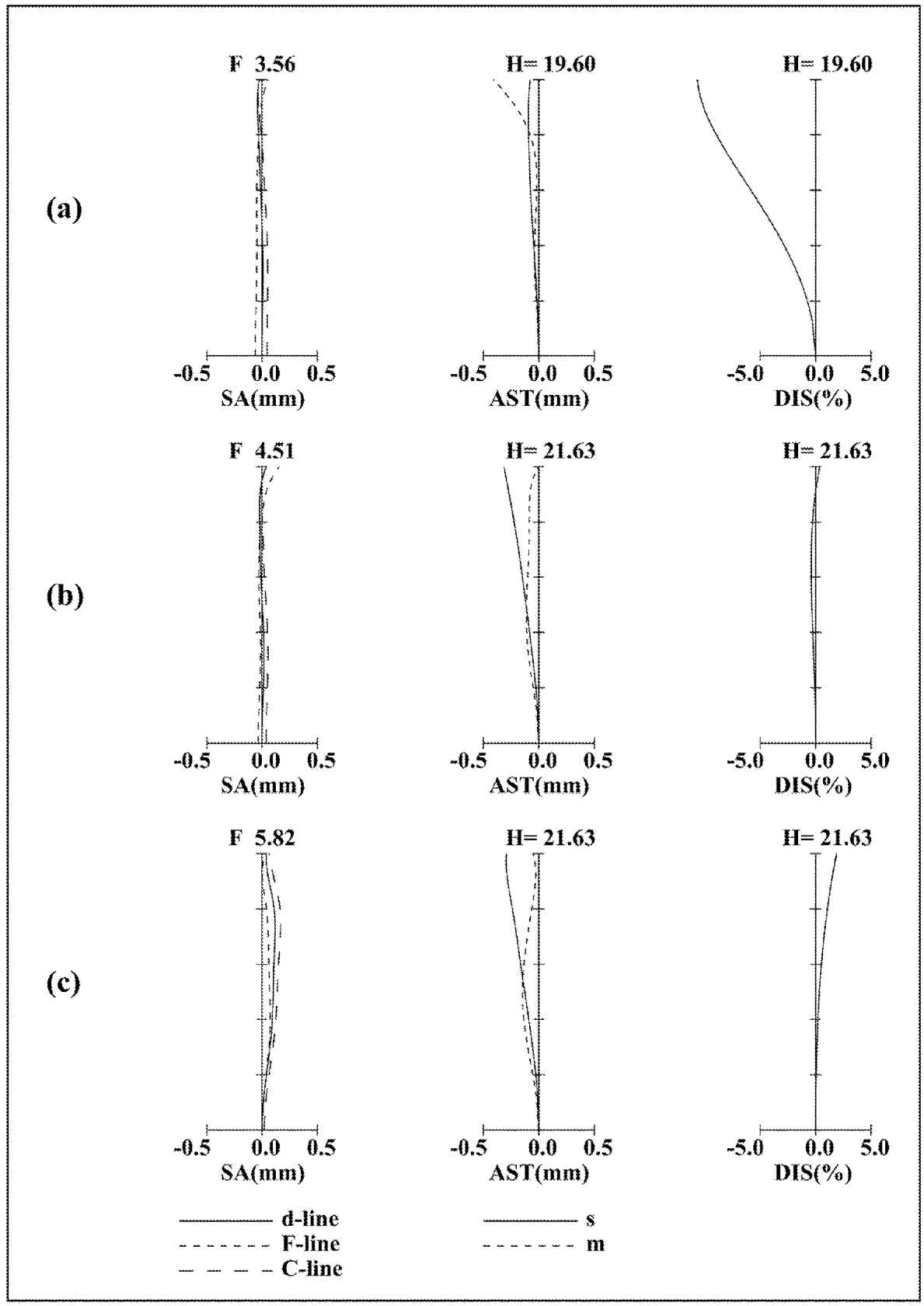
FIG. 2 illustrates longitudinal aberration diagrams showing what state the zoom lens system assumes at the infinity focus point in the first example of numerical values.

Embodiments of the present disclosure will now be described in detail with reference to the accompanying drawings as appropriate. Note that unnecessarily detailed description may be omitted. For example, detailed description of already well-known matters and redundant description of substantially the same configuration may be omitted. This is done to avoid making the following description overly redundant and thereby to help one of ordinary skill in the art understand the present disclosure easily.

In addition, note that the accompanying drawings and the following description are provided to help one of ordinary skill in the art understand the present disclosure fully and should not be construed as limiting the scope of the present disclosure, which is defined by the appended claims.

First to Fourth Embodiments

FIGS. 1, 3, 5, and 7 illustrate lens arrangement diagrams according to first, second, third, and fourth embodiments, each showing what state a zoom lens system assumes at an infinity focus point.

In FIGS. 1, 3, 5, and 7, portion (a) illustrates a lens arrangement at the wide-angle end (which is a state with the shortest focal length fW); portion (b) illustrates a lens arrangement at a middle position (which is a state with a middle focal length $fM=\sqrt{(fW*fT)}$); and portion (c) illustrates a lens arrangement at the telephoto end (which is a state with the longest focal length fT). Note that portions (a), (b), and (c) of FIGS. 1, 3, 5, and 7 have the same aspect ratio.

Also, in FIGS. 1, 3, 5, and 7, the polygon arrows shown between portions (a) and (b) thereof each connect together the respective positions of the lens groups at the wide-angle end (Wide), middle position (Mid), and telephoto end (Tele) from top to bottom. Note that these polygon arrows just connect the wide-angle end to the middle position and the middle position to the telephoto end with the curves, and do not indicate the actual movement of the lens groups.

Also, the arrows added to the lens groups in FIGS. 1, 3, 5, and 7 each indicate the direction of movement while the zoom lens system is focusing to make a transition from the infinity in-focus state toward the close-object in-focus state. Note that in FIGS. 1, 3, 5, and 7, the reference signs of respective lens groups are shown under the respective lens groups in portion (a) thereof, and therefore, an arrow indicating focusing is shown under the sign of each lens group for convenience's sake. The directions of movement of the respective lens groups during focusing will be described more specifically later with respect to each of the first through fourth embodiments.

Furthermore, in FIGS. 1, 3, 5, and 7, the asterisk (*) attached to a particular surface indicates that the surface is an aspheric surface. Furthermore, the signs (+) and (−) added to the reference signs of the respective lens groups in FIGS. 1, 3, 5, and 7 indicate the powers of the respective lens groups. Furthermore, in FIGS. 1, 3, 5, and 7, the straight line drawn at the right end indicates the position of the image plane S (i.e., a surface, facing the object, of the image sensor).

First Embodiment

FIG. 1 illustrates a zoom lens system according to a first embodiment.

The zoom lens system includes: a first lens group G1 having positive power; a second lens group G2 having negative power; a third lens group G3 having positive power; a fourth lens group G4 having negative power; and a fifth lens group G5 having positive power. The first, second, third, fourth, and fifth lens groups G1-G5 are arranged in this order such that the first lens group G1 is located closer to an object than any other lens group is and that the fifth lens group G5 is located closer to an image than any other lens group is.

The first lens group G1 is made up of a first lens L1 having positive power.

The second lens group G2 is made up of: a second lens L2 having negative power; a third lens L3 having negative power; a fourth lens L4 having positive power, and a fifth lens L5 having negative power, which are arranged in this order such that the second lens L2 is located closer to the object than any other member of this second lens group G2 is and that the fifth lens L5 is located closer to the image than any other member of this second lens group G2 is.

The third lens group G3 is made up of: an aperture stop A; a sixth lens L6 having positive power; a seventh lens L7 having positive power; an eighth lens L8 having negative power, and a ninth lens L9 having positive power, which are arranged in this order such that the aperture stop A is located closer to the object than any other member of this third lens group G3 is and that the ninth lens L9 is located closer to the image than any other member of this third lens group G3 is.

The fourth lens group G4 is made up of a tenth lens L10 having negative power.

The fifth lens group G5 is made up of an eleventh lens L11 having positive power.

The respective lenses will be described.

First of all, the lens that forms the first lens group G1 will be described. The first lens L1 is a meniscus lens having a convex surface facing the object.

Next, the respective lenses that form the second lens group G2 will be described. The second lens L2 is a meniscus lens having a convex surface facing the object. The third lens L3 is a biconcave lens. The fourth lens L4 is a biconvex lens. The fifth lens L5 is a biconcave lens. The third lens L3 and the fourth lens L4 together form a bonded lens by being bonded together with an adhesive, for example. The second lens L2 is an example of a negative lens L2$a$. The third lens L3 is an example of a negative lens L2$b$. The fourth lens L4 is an example of a positive lens L2$c$. The fifth lens L5 is an example of a negative lens L2$d$.

Next, the respective lenses that form the third lens group G3 will be described. The sixth lens L6 is a meniscus lens having a convex surface facing the object. Both surfaces of the sixth lens L6 are aspheric surfaces. The seventh lens L7 is a biconvex lens. The eighth lens L8 is a plano-concave lens, of which a surface facing the image is a concave surface. The ninth lens L9 is a biconvex lens. The eighth lens L8 and the ninth lens L9 together form a bonded lens by being bonded together with an adhesive, for example. The sixth lens L6 is an example of a positive lens L3$a$. The seventh lens L7 is an example of a positive lens L3$b$. The eighth lens L8 is an example of a negative lens L3$c$. The ninth lens L9 is an example of a positive lens L3$d$.

Next, the lens that forms the fourth lens group G4 will be described. The tenth lens L10 is a biconcave lens, both surfaces of which are aspheric surfaces.

Next, the lens that forms the fifth lens group G5 will be described. The eleventh lens L11 is a meniscus lens having a convex surface facing the image. The eleventh lens L11 is an example of a single lens L5$a$.

While the zoom lens system is zooming from the wide-angle end toward the telephoto end during a shooting session, the fifth lens group G5 does not move but the first to fourth lens groups G1-G4 move toward the object. In addition, as the zoom lens system is zooming, the respective lens groups move along the optical axis such that the interval between the first lens group G1 and the second lens group G2 increases, the interval between the second lens group G2 and the third lens group G3 decreases, the interval between the third lens group G3 and the fourth lens group G4 increases, and the interval between the fourth lens group G4 and the fifth lens group G5 increases.

While the zoom lens system is focusing to make a transition from the infinity in-focus state toward the close-object in-focus state, the fourth lens group G4 moves along the optical axis toward the image plane.

Second Embodiment

Figure 3:
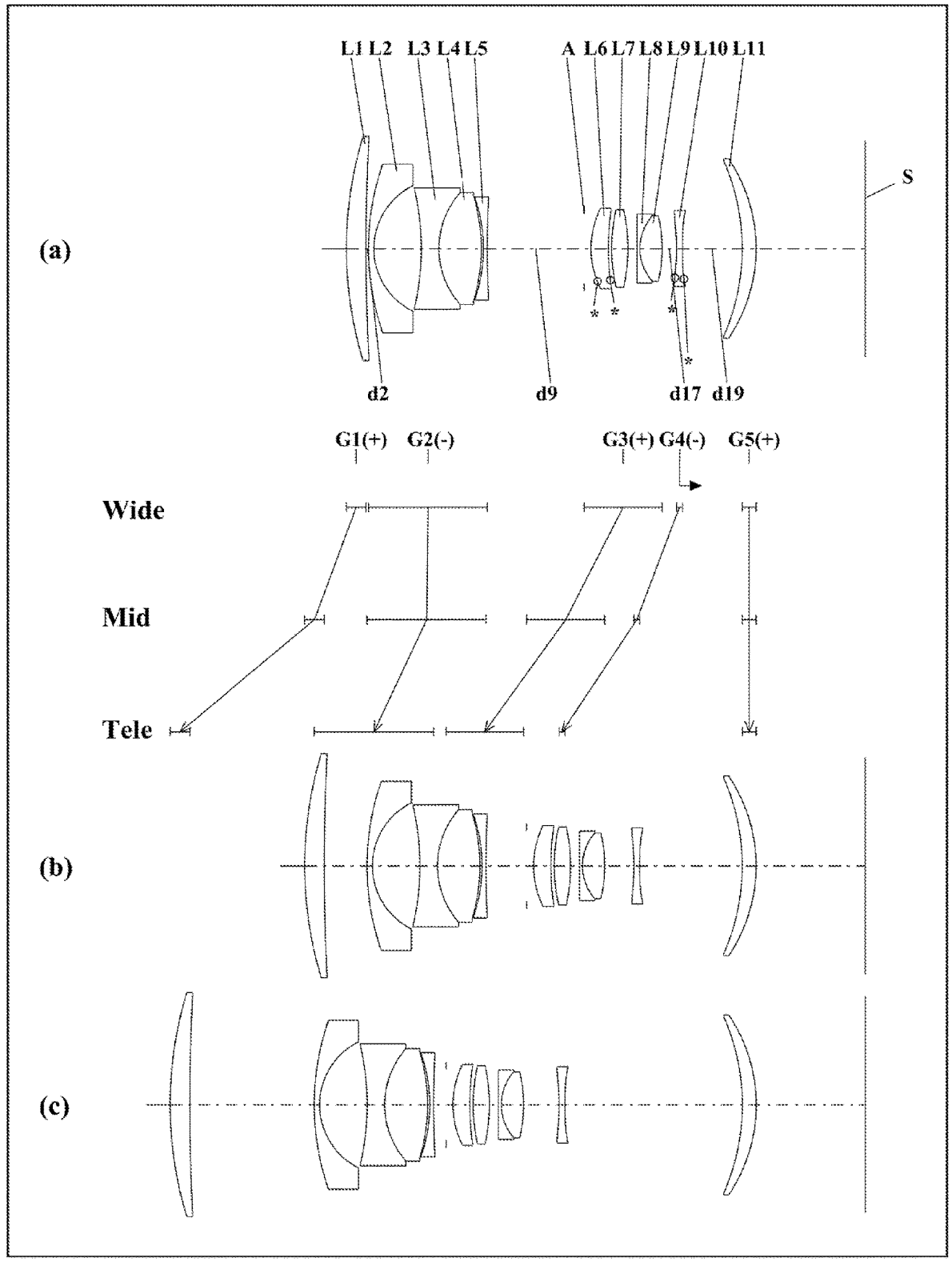
FIG. 3 illustrates lens arrangements showing what state a zoom lens system according to a second embodiment (corresponding to a second example of numerical values) assumes at an infinity focus point.

FIG. 3 illustrates a zoom lens system according to a second embodiment.

The zoom lens system includes: a first lens group G1 having positive power; a second lens group G2 having negative power; a third lens group G3 having positive power; a fourth lens group G4 having negative power; and a fifth lens group G5 having positive power. The first, second, third, fourth, and fifth lens groups G1-G5 are arranged in this order such that the first lens group G1 is located closer to an object than any other lens group is and that the fifth lens group G5 is located closer to an image than any other lens group is.

The first lens group G1 is made up of a first lens L1 having positive power.

The second lens group G2 is made up of: a second lens L2 having negative power; a third lens L3 having negative power; a fourth lens L4 having positive power, and a fifth lens L5 having negative power, which are arranged in this order such that the second lens L2 is located closer to the object than any other member of this second lens group G2 is and that the fifth lens L5 is located closer to the image than any other member of this second lens group G2 is.

The third lens group G3 is made up of: an aperture stop A; a sixth lens L6 having positive power; a seventh lens L7 having positive power; an eighth lens L8 having negative power, and a ninth lens L9 having positive power, which are arranged in this order such that the aperture stop A is located closer to the object than any other member of this third lens group G3 is and that the ninth lens L9 is located closer to the image than any other member of this third lens group G3 is.

The fourth lens group G4 is made up of a tenth lens L10 having negative power.

The fifth lens group G5 is made up of an eleventh lens L11 having positive power.

The respective lenses will be described.

First of all, the lens that forms the first lens group G1 will be described. The first lens L1 is a meniscus lens having a convex surface facing the object.

Next, the respective lenses that form the second lens group G2 will be described. The second lens L2 is a meniscus lens having a convex surface facing the object. The third lens L3 is a biconcave lens. The fourth lens L4 is a biconvex lens. The fifth lens L5 is a biconcave lens. The third lens L3 and the fourth lens L4 together form a bonded lens by being bonded together with an adhesive, for example. The second lens L2 is an example of a negative lens L2a. The third lens L3 is an example of a negative lens L2b. The fourth lens L4 is an example of a positive lens L2c. The fifth lens L5 is an example of a negative lens L2d.

Next, the respective lenses that form the third lens group G3 will be described. The sixth lens L6 is a meniscus lens having a convex surface facing the object. Both surfaces of the sixth lens L6 are aspheric surfaces. The seventh lens L7 is a biconvex lens. The eighth lens L8 is a plano-concave lens, of which a surface facing the image is a concave surface. The ninth lens L9 is a biconvex lens. The eighth lens L8 and the ninth lens L9 together form a bonded lens by being bonded together with an adhesive, for example. The sixth lens L6 is an example of a positive lens L3a. The seventh lens L7 is an example of a positive lens L3b. The eighth lens L8 is an example of a negative lens L3c. The ninth lens L9 is an example of a positive lens L3d.

Next, the lens that forms the fourth lens group G4 will be described. The tenth lens L10 is a biconcave lens, both surfaces of which are aspheric surfaces.

Next, the lens that forms the fifth lens group G5 will be described. The eleventh lens L11 is a meniscus lens having a convex surface facing the image. The eleventh lens L11 is an example of a single lens L5a.

While the zoom lens system is zooming from the wide-angle end toward the telephoto end during a shooting session, the fifth lens group G5 does not move but the first to fourth lens groups G1-G4 move toward the object. In addition, as the zoom lens system is zooming, the respective lens groups move along the optical axis such that the interval between the first lens group G1 and the second lens group G2 increases, the interval between the second lens group G2 and the third lens group G3 decreases, the interval between the third lens group G3 and the fourth lens group G4 increases, and the interval between the fourth lens group G4 and the fifth lens group G5 increases.

While the zoom lens system is focusing to make a transition from the infinity in-focus state toward the close-object in-focus state, the fourth lens group G4 moves along the optical axis toward the image plane.

Third Embodiment

Figure 5:
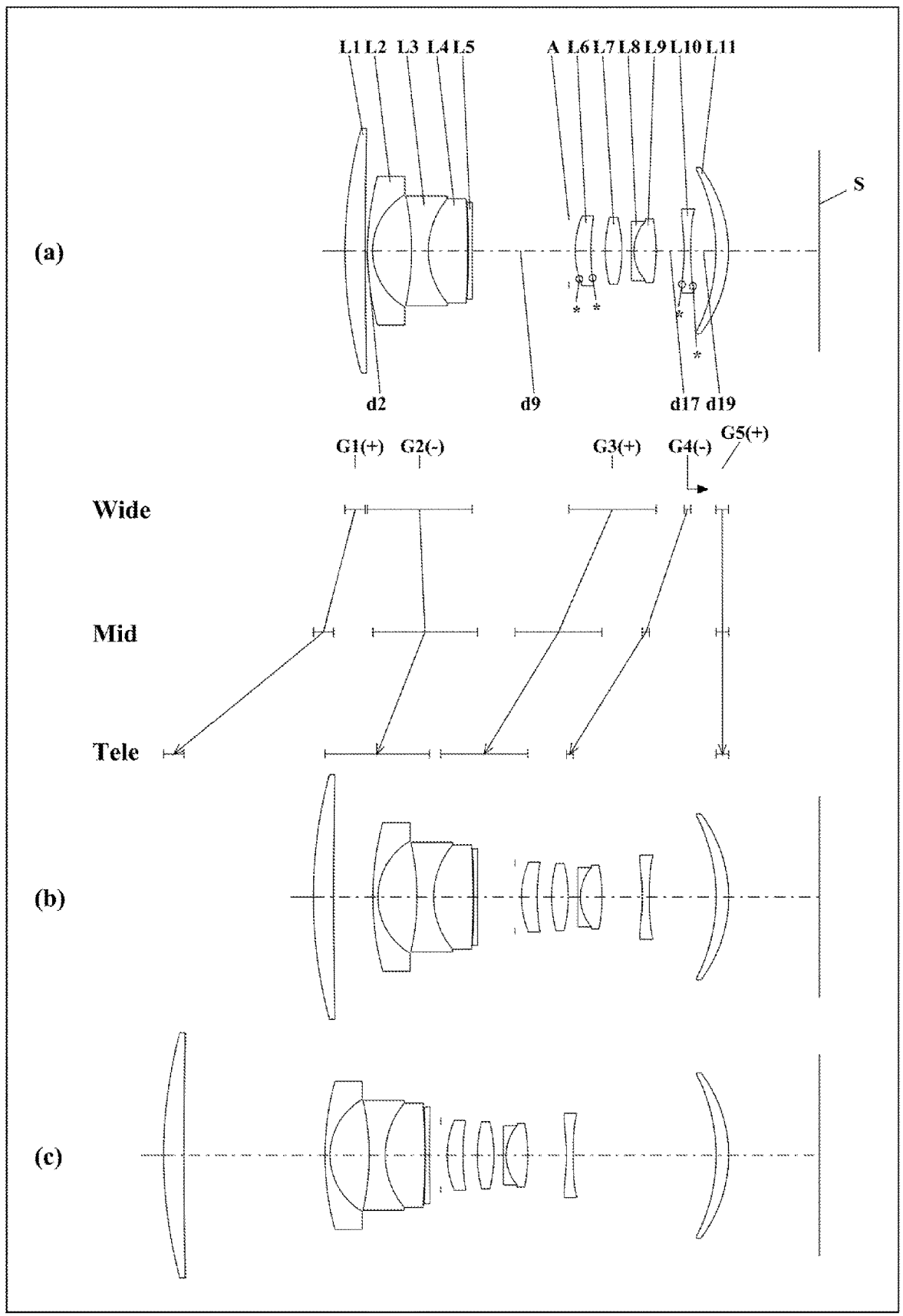
FIG. 5 illustrates lens arrangements showing what state a zoom lens system according to a third embodiment (corresponding to a third example of numerical values) assumes at an infinity focus point.
Figure 6:
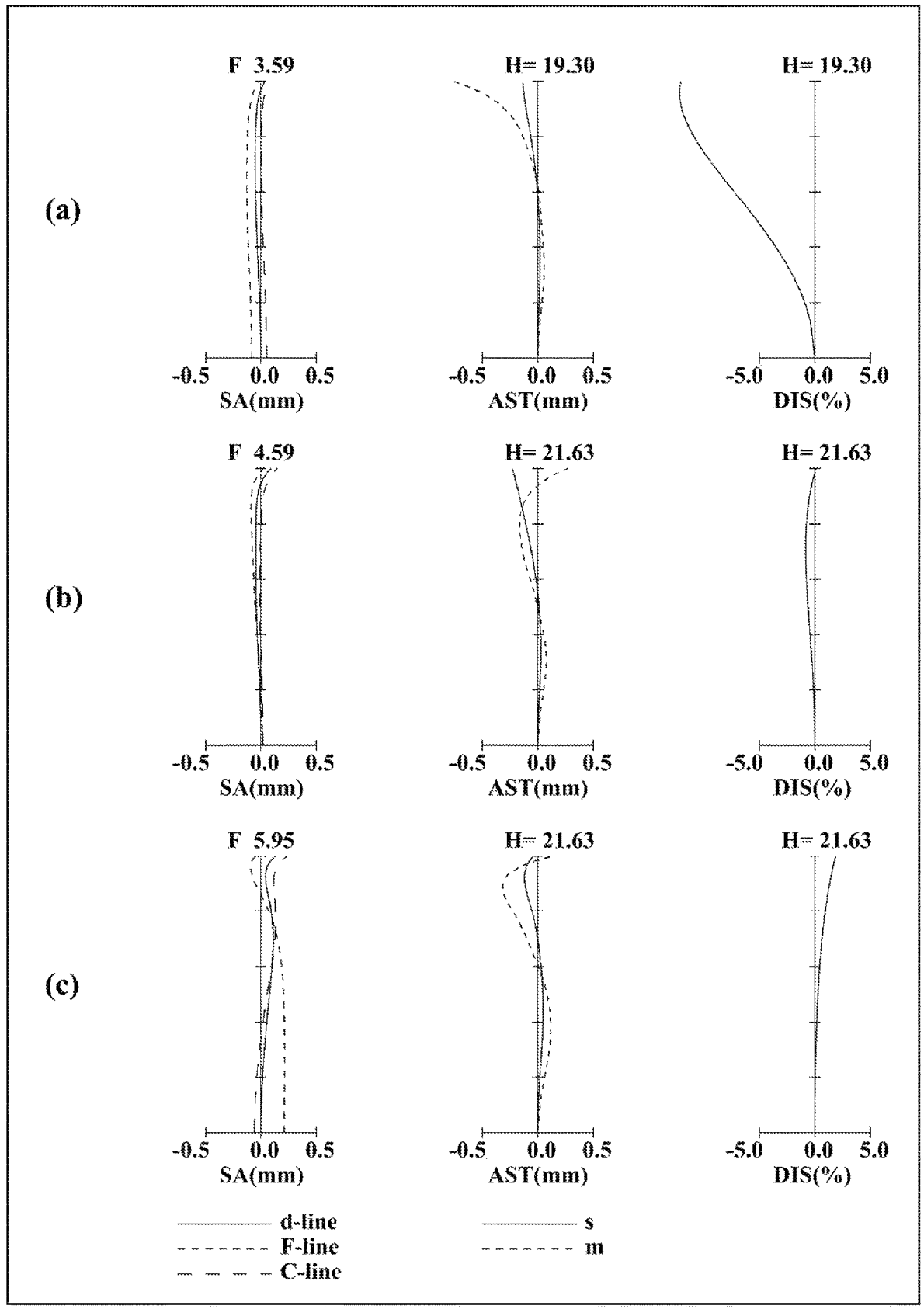
FIG. 6 illustrates longitudinal aberration diagrams showing what state the zoom lens system assumes at the infinity focus point in the third example of numerical values.

FIG. 5 illustrates a zoom lens system according to a third embodiment.

The zoom lens system includes: a first lens group G1 having positive power; a second lens group G2 having negative power; a third lens group G3 having positive power; a fourth lens group G4 having negative power; and a fifth lens group G5 having positive power. The first, second, third, fourth, and fifth lens groups G1-G5 are arranged in this order such that the first lens group G1 is located closer to an object than any other lens group is and that the fifth lens group G5 is located closer to an image than any other lens group is.

The first lens group G1 is made up of a first lens L1 having positive power.

The second lens group G2 is made up of: a second lens L2 having negative power; a third lens L3 having negative power; a fourth lens L4 having positive power, and a fifth lens L5 having negative power, which are arranged in this order such that the second lens L2 is located closer to the object than any other member of this second lens group G2 is and that the fifth lens L5 is located closer to the image than any other member of this second lens group G2 is.

The third lens group G3 is made up of: an aperture stop A; a sixth lens L6 having positive power; a seventh lens L7 having positive power; an eighth lens L8 having negative power, and a ninth lens L9 having positive power, which are arranged in this order such that the aperture stop A is located closer to the object than any other member of this third lens group G3 is and that the ninth lens L9 is located closer to the image than any other member of this third lens group G3 is.

The fourth lens group G4 is made up of a tenth lens L10 having negative power.

The fifth lens group G5 is made up of an eleventh lens L11 having positive power.

The respective lenses will be described.

First of all, the lens that forms the first lens group G1 will be described. The first lens L1 is a meniscus lens having a convex surface facing the object.

Next, the respective lenses that form the second lens group G2 will be described. The second lens L2 is a meniscus lens having a convex surface facing the object. The third lens L3 is a biconcave lens. The fourth lens L4 is a biconvex lens. The fifth lens L5 is a biconcave lens. The third lens L3 and the fourth lens L4 together form a bonded lens by being bonded together with an adhesive, for example. The second lens L2 is an example of a negative lens L2a. The third lens L3 is an example of a negative lens L2b. The fourth lens L4 is an example of a positive lens L2c. The fifth lens L5 is an example of a negative lens L2d.

Next, the respective lenses that form the third lens group G3 will be described. The sixth lens L6 is a meniscus lens having a convex surface facing the object. Both surfaces of the sixth lens L6 are aspheric surfaces. The seventh lens L7 is a biconvex lens. The eighth lens L8 is a plano-concave lens, of which a surface facing the image is a concave surface. The ninth lens L9 is a biconvex lens. The eighth lens L8 and the ninth lens L9 together form a bonded lens by being bonded together with an adhesive, for example. The sixth lens L6 is an example of a positive lens L3$a$. The seventh lens L7 is an example of a positive lens L3$b$. The eighth lens L8 is an example of a negative lens L3$c$. The ninth lens L9 is an example of a positive lens L3$d$.

Next, the lens that forms the fourth lens group G4 will be described. The tenth lens L10 is a biconcave lens, both surfaces of which are aspheric surfaces.

Next, the lens that forms the fifth lens group G5 will be described. The eleventh lens L11 is a meniscus lens having a convex surface facing the image. The eleventh lens L11 is an example of a single lens L5$a$.

While the zoom lens system is zooming from the wide-angle end toward the telephoto end during a shooting session, the fifth lens group G5 does not move, the first lens group G1 moves toward the object, the second lens group G2 moves to draw a locus that is convex toward the image, and the third and fourth lens groups G3, G4 move toward the object. In addition, as the zoom lens system is zooming, the respective lens groups move along the optical axis such that the interval between the first lens group G1 and the second lens group G2 increases, the interval between the second lens group G2 and the third lens group G3 decreases, the interval between the third lens group G3 and the fourth lens group G4 increases from the wide-angle end through a middle position but decreases from the middle position through the telephoto end, and the interval between the fourth lens group G4 and the fifth lens group G5 increases.

While the zoom lens system is focusing to make a transition from the infinity in-focus state toward the close-object in-focus state, the fourth lens group G4 moves along the optical axis toward the image plane.

Fourth Embodiment

Figure 7:
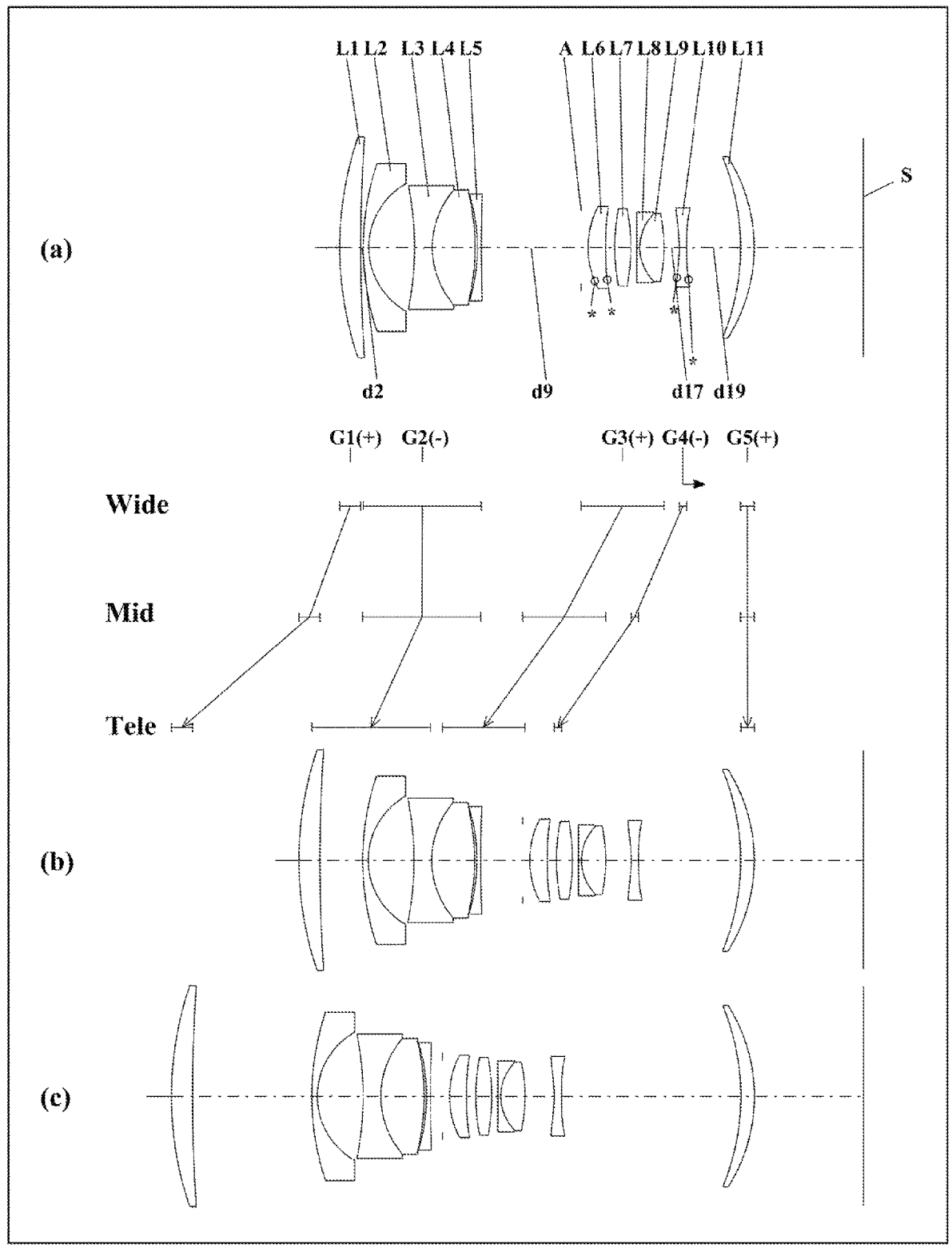
FIG. 7 illustrates lens arrangements showing what state a zoom lens system according to a fourth embodiment (corresponding to a fourth example of numerical values) assumes at an infinity focus point.
Figure 8:
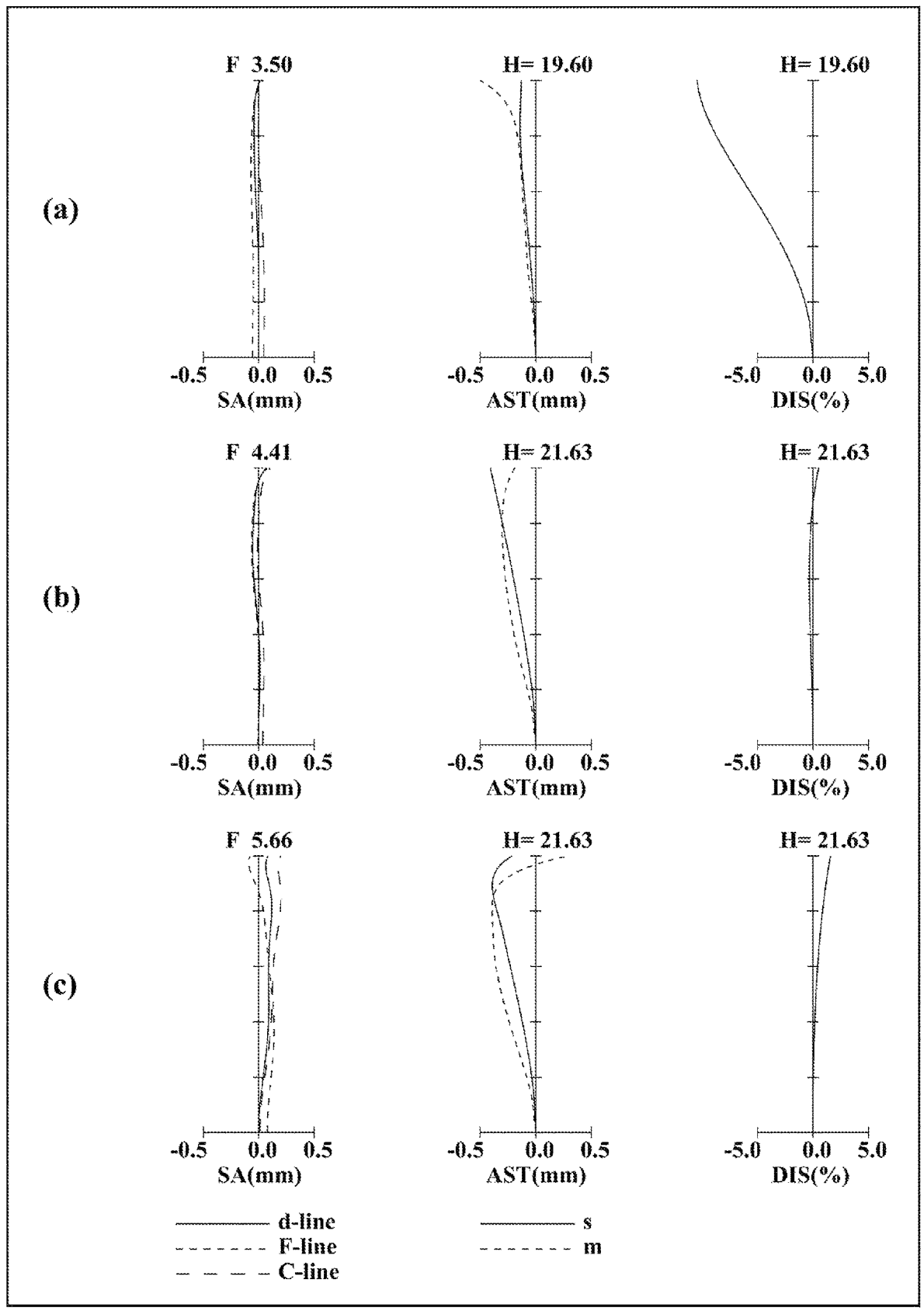
FIG. 8 illustrates longitudinal aberration diagrams showing what state the zoom lens system assumes at the infinity focus point in the fourth example of numerical values.

FIG. 7 illustrates a zoom lens system according to a fourth embodiment.

The zoom lens system includes: a first lens group G1 having positive power; a second lens group G2 having negative power; a third lens group G3 having positive power; a fourth lens group G4 having negative power; and a fifth lens group G5 having positive power. The first, second, third, fourth, and fifth lens groups G1-G5 are arranged in this order such that the first lens group G1 is located closer to an object than any other lens group is and that the fifth lens group G5 is located closer to an image than any other lens group is.

The first lens group G1 is made up of a first lens L1 having positive power.

The second lens group G2 is made up of: a second lens L2 having negative power; a third lens L3 having negative power; a fourth lens L4 having positive power, and a fifth lens L5 having negative power, which are arranged in this order such that the second lens L2 is located closer to the object than any other member of this second lens group G2 is and that the fifth lens L5 is located closer to the image than any other member of this second lens group G2 is.

The third lens group G3 is made up of: an aperture stop A; a sixth lens L6 having positive power; a seventh lens L7 having positive power; an eighth lens L8 having negative power, and a ninth lens L9 having positive power, which are arranged in this order such that the aperture stop A is located closer to the object than any other member of this third lens group G3 is and that the ninth lens L9 is located closer to the image than any other member of this third lens group G3 is.

The fourth lens group G4 is made up of a tenth lens L10 having negative power.

The fifth lens group G5 is made up of an eleventh lens L11 having positive power.

The respective lenses will be described.

First of all, the lens that forms the first lens group G1 will be described. The first lens L1 is a meniscus lens having a convex surface facing the object.

Next, the respective lenses that form the second lens group G2 will be described. The second lens L2 is a meniscus lens having a convex surface facing the object. The third lens L3 is a biconcave lens. The fourth lens L4 is a biconvex lens. The fifth lens L5 is a biconcave lens. The third lens L3 and the fourth lens L4 together form a bonded lens by being bonded together with an adhesive, for example. The second lens L2 is an example of a negative lens L2$a$. The third lens L3 is an example of a negative lens L2$b$. The fourth lens L4 is an example of a positive lens L2$c$. The fifth lens L5 is an example of a negative lens L2$d$.

Next, the respective lenses that form the third lens group G3 will be described. The sixth lens L6 is a meniscus lens having a convex surface facing the object. Both surfaces of the sixth lens L6 are aspheric surfaces. The seventh lens L7 is a biconvex lens. The eighth lens L8 is a biconcave lens. The ninth lens L9 is a biconvex lens. The eighth lens L8 and the ninth lens L9 together form a bonded lens by being bonded together with an adhesive, for example. The sixth lens L6 is an example of a positive lens L3$a$. The seventh lens L7 is an example of a positive lens L3$b$. The eighth lens L8 is an example of a negative lens L3$c$. The ninth lens L9 is an example of a positive lens L3$d$.

Next, the lens that forms the fourth lens group G4 will be described. The tenth lens L10 is a biconcave lens, both surfaces of which are aspheric surfaces.

Next, the lens that forms the fifth lens group G5 will be described. The eleventh lens L11 is a meniscus lens having a convex surface facing the image. The eleventh lens L11 is an example of a single lens L5$a$.

While the zoom lens system is zooming from the wide-angle end toward the telephoto end during a shooting session, the fifth lens group G5 does not move but the first to fourth lens groups G1-G4 move toward the object. In addition, as the zoom lens system is zooming, the respective lens groups move along the optical axis such that the interval between the first lens group G1 and the second lens group G2 increases, the interval between the second lens group G2 and the third lens group G3 decreases, the interval between the third lens group G3 and the fourth lens group G4 increases, and the interval between the fourth lens group G4 and the fifth lens group G5 increases.

While the zoom lens system is focusing to make a transition from the infinity in-focus state toward the close-object in-focus state, the fourth lens group G4 moves along the optical axis toward the image plane.

(Conditions and Advantages)

Next, conditions for implementing the zoom lens systems according to the first to fourth embodiments, for example, will be described. That is to say, a plurality of possible conditions are defined for the zoom lens systems according to each of these four embodiments. In that case, a zoom lens system, of which the configuration satisfies all of these possible conditions, is most advantageous. Alternatively, a zoom lens system that achieves its expected advantages by satisfying the individual conditions to be described below may also be obtained.

For example, as in the zoom lens system according to the first to fourth embodiments described above, a zoom lens system according to an aspect of the present disclosure includes: a first lens group G1 having positive power; a second lens group G2 having negative power; a third lens group G3 having positive power; a fourth lens group G4 having negative power; and a fifth lens group G5 having positive power. The first, second, third, fourth, and fifth lens groups G1-G5 are arranged in this order such that the first lens group G1 is located closer to an object than any of the second, third, fourth, or fifth lens group G2, G3, G4, G5 is and that the fifth lens group G5 is located closer to an image than any of the first, second, third, or fourth lens group G1, G2, G3, G4 is. The first lens group G1 is made up of a single lens. The second lens group G2 is made up of four lenses. While the zoom lens system is zooming from a wide-angle end toward a telephoto end during a shooting session, the fifth lens group G5 does not move but the first to fourth lens groups G1-G4 move to change intervals between all of the first through fifth lens groups G1-G5. This provides a zoom lens system with the ability to compensate for various types of aberrations sufficiently over the entire zoom range while obtaining a wide angle of view at the wide-angle end.

Also, in the zoom lens system, for example, the second lens group G2 suitably includes a negative lens L2d which is located closer to the image than any other member of the second lens group G2 is. This allows the zoom lens system to be downsized.

Furthermore, in the zoom lens system, for example, the second lens group G2 is suitably made up of: a negative lens L2a; a negative lens L2b; a positive lens L2c; and the negative lens L2d. The negative lens L2a, the negative lens L2b, the positive lens L2c, and the negative lens L2d are arranged in this order such that the negative lens L2a is located closer to the object than any other member of the second lens group G2 is and that the negative lens L2d is located closer to the image than any other member of the second lens group G2 is. This allows the refractive angle of a light beam incident on the negative lens L2d to be decreased, thus reducing various types of aberrations (e.g., the field curvature, in particular).

Furthermore, the zoom lens system suitably satisfies the following Inequality (1), for example:

$$vL2b > 62 \quad (1)$$

where vL2b is an abbe number with respect to a d-line of the negative lens L2b.

The condition expressed by this inequality (1) defines the abbe number with respect to a d-line of the negative lens L2b. If the abbe number were less than the lower limit defined by this Inequality (1), then it would be difficult to compensate for various types of aberrations (such as a chromatic aberration of magnification and an axial chromatic aberration, among other things).

To enhance the advantage described above, the condition expressed by the following Inequality (1a) is suitably satisfied:

$$vL2b > 65 \quad (1a)$$

More suitably, to further enhance the advantage described above, the condition expressed by the following Inequality (1b) may be satisfied:

$$vL2b > 67 \quad (1b)$$

Furthermore, in the zoom lens system, for example, the second lens group G2 suitably includes a negative lens L2a which is located closer to the object than any other member of the second lens group G2 is, and the zoom lens system suitably satisfies the following Inequality (2):

$$nL2a > 1.9 \quad (2)$$

where nL2a is a refractive index with respect to a d-line of the negative lens L2a.

The condition expressed by this Inequality (2) defines a refractive index with respect to a d-line of the negative lens L2a. If the refractive index were less than the lower limit defined by this Inequality (2), then it would be difficult to compensate for the field curvature at the wide-angle end, in particular.

To enhance the advantage described above, the condition expressed by the following Inequality (2a) is suitably satisfied:

$$nL2a > 1.95 \quad (2a)$$

More suitably, to further enhance the advantage described above, the condition expressed by the following Inequality (2b) may be satisfied:

$$nL2a > 2.00 \quad (2b)$$

Furthermore, in the zoom lens system, for example, the third lens group G3 is suitably made up of: a positive lens L3a; a positive lens L3b; a negative lens L3c; and a positive lens L3d. The positive lens L3a, the positive lens L3b, the negative lens L3c, and the positive lens L3d are suitably arranged in this order such that the positive lens L3a is located closer to the object than any other lens of this third lens group G3 is and that the positive lens L3d is located closer to the image than any other lens of the third lens group G3 is. The zoom lens system suitably satisfies the following Inequality (3):

$$vL3d > 62 \quad (3)$$

where vL3d is an abbe number with respect to a d-line of the positive lens L3d.

The condition expressed by this inequality (3) defines the abbe number with respect to a d-line of the positive lens L3d. If the abbe number were less than the lower limit defined by this Inequality (3), then it would be difficult to compensate for various types of aberrations (such as an axial chromatic aberration, among other things).

To enhance the advantage described above, the condition expressed by the following Inequality (3a) is suitably satisfied:

$$vL3d > 65 \quad (3a)$$

More suitably, to further enhance the advantage described above, the condition expressed by the following Inequality (3b) may be satisfied:

$$vL3d > 67 \quad (3b)$$

Furthermore, for example, the zoom lens system suitably satisfies the following Inequality (4):

$$0.5 < |f4/fT| < 1.1 \quad (4)$$

where f4 is a focal length of the fourth lens group G4 and fT is a focal length of the entire zoom lens system at the telephoto end.

The condition expressed by this Inequality (4) defines a power ratio between the focal length of the fourth lens group G4 and the focal length of the entire zoom lens system at the telephoto end. If the power ratio were less than the lower limit defined by this Inequality (4), then the power of the focus group would be too strong to avoid causing a decline in focus stop accuracy. Conversely, if the power ratio were greater than the upper limit defined by this Inequality (4), then the power of the focus group would be too weak to avoid causing a decline in focus speed. In contrast, satisfying the condition defined by this Inequality (4) will strike an adequate balance between the focus speed and the stop accuracy.

To enhance the advantage described above, one of the conditions expressed by the following Inequalities (4a) and (4b) is suitably satisfied:

$$0.6<|f4/fT| \tag{4a}$$

$$|f4/fT|<0.9 \tag{4b}$$

More suitably, to further enhance the advantage described above, one of the conditions expressed by the following Inequalities (4c) and (4d) may be satisfied:

$$0.7<|f4/fT| \tag{4c}$$

$$|f4/fT|<0.85 \tag{4d}$$

Furthermore, for example, the zoom lens system suitably satisfies the following Inequality (5):

$$0.5<f5/f1<1.0 \tag{5}$$

where f1 is a focal length of the first lens group G1 and f5 is a focal length of the fifth lens group G5.

The condition expressed by this Inequality (5) defines a ratio between the focal length of the first lens group G1 and the focal length of the fifth lens group G5. If the ratio were less than the lower limit defined by this Inequality (5), then it would be difficult to cancel the aberrations of the first lens group G1 and the fifth lens group G5, thus making it difficult to compensate for the field curvature. Conversely, if the ratio were greater than the upper limit defined by this Inequality (5), then the spherical aberration and field curvature produced by the first lens group G1 would be too large to avoid deterioration in image quality. In contrast, satisfying the condition expressed by this Inequality (5) allows the aberrations of the first lens group G1 and the fifth lens group G5 to be canceled effectively.

To enhance the advantage described above, one of the conditions expressed by the following Inequalities (5a) and (5b) is suitably satisfied:

$$0.55<f5/f1 \tag{5a}$$

$$f5/f1<0.95 \tag{5b}$$

More suitably, to further enhance the advantage described above, one of the conditions expressed by the following Inequalities (5c) and (5d) may be satisfied:

$$0.6<f5/f1 \tag{5c}$$

$$f5/f1<0.9 \tag{5d}$$

Furthermore, in the zoom lens system, for example, the fifth lens group L5 is suitably made up of a single lens L5a, and the zoom lens system suitably satisfies the following Inequality (6):

$$1.8<nL5a \tag{6}$$

where nL5a is a refractive index with respect to a d-line of the single lens L5a.

The condition expressed by this Inequality (6) defines a refractive index with respect to a d-line of the single lens L5a. If the refractive index were less than the lower limit defined by this Inequality (6), then it would be difficult to compensate for the field curvature at the wide-angle end, in particular.

To enhance the advantage described above, the condition expressed by the following Inequality (6a) is suitably satisfied:

$$1.85<nL5a \tag{6a}$$

More suitably, to further enhance the advantage described above, the condition expressed by the following Inequality (6b) may be satisfied:

$$1.9<nL5a \tag{6b}$$

Furthermore, in the zoom lens system, for example, the fifth lens group G5 is suitably made up of a single lens L5a, and the zoom lens system suitably satisfies the following Inequality (7):

$$-8.5<(L5aR1+L5aR2)/(L5aR2-L5aR1) \tag{7}$$

where L5aR1 is a radius of curvature of a surface, facing the object, of the single lens L5a and L5aR2 is a radius of curvature of a surface, facing the image, of the single lens L5a.

The condition expressed by this Inequality (7) defines a shape factor of the single lens L5a that forms the fifth lens group G5. If the ratio were less than the lower limit defined by this Inequality (7), then it would be difficult to compensate for the distortion at the wide-angle end to cause an increase in total optical length.

The condition expressed by the following Inequality (7a) is suitably satisfied. If the ratio were greater than the upper limit defined by this Inequality (7a), then it would be difficult to compensate for various types of aberrations (such as distortion, among other things).

$$(L5aR1+L5aR2)/(L5aR2+L5aR1)<1.0 \tag{7a}$$

More suitably, to further enhance the advantage described above, one of the conditions expressed by the following Inequalities (7c) and (7d) may be satisfied:

$$-8.0<(L5aR1+L5aR2)/(L5aR2-L5aR1) \tag{7c}$$

$$(L5aR1+L5aR2)/(L5aR2-L5aR1)<-3.0 \tag{7d}$$

Figure 9:
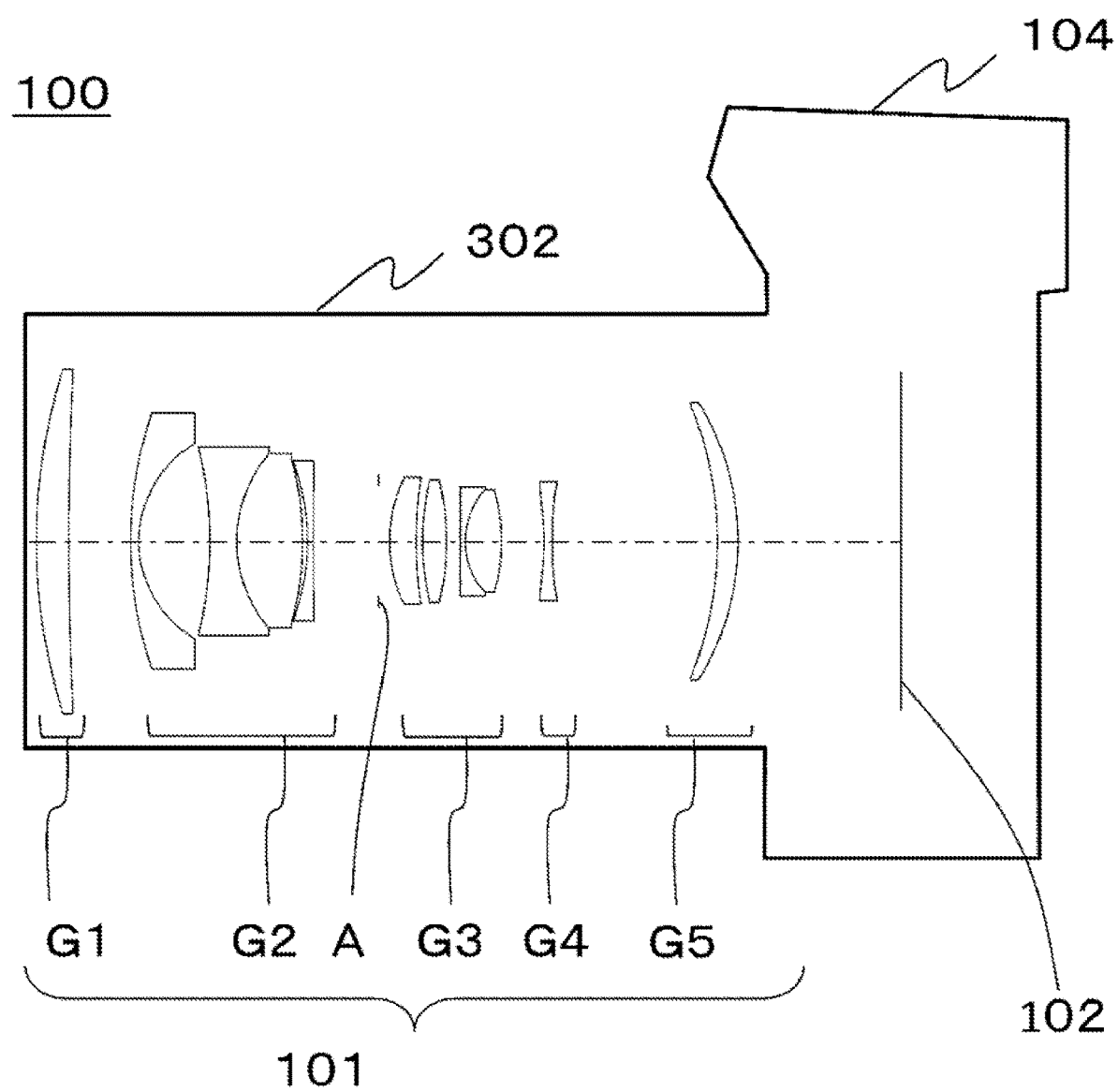
FIG. 9 illustrates a schematic configuration for a digital camera according to the first embodiment.

Schematic Configuration for Image Capture Device to which First Embodiment is Applied FIG. 9 illustrates a schematic configuration for an image capture device, to which the zoom lens system of the first embodiment is applied. Optionally, the zoom lens system according to the second, third, or fourth embodiment is also applicable to the image capture device.

The image capture device 100 includes a housing 104, an image sensor 102, and the zoom lens system 101. The image capture device 100 may be implemented as a digital camera, for example.

The zoom lens system 101 includes the first lens group G1, the second lens group G2, the third lens group G3, and the fourth lens group G4.

The third lens group G3 includes the aperture stop A.

A lens barrel 302 holds the respective lens groups and the aperture stop A that form the zoom lens system 101.

The image sensor 102 is arranged at the image plane S of the zoom lens system according to the first embodiment.

In addition, an actuator, a lens frame, and other members housed in the housing 104 are arranged with respect to the zoom lens system 101 such that the intervals between the first lens group G1, the second lens group G2, the third lens group G3, and the fourth lens group G4 change while the zoom lens system 101 is zooming.

This provides an image capture device in which various types of aberrations have been compensated for sufficiently.

In the example described above, the zoom lens system according to the first embodiment is applied to a digital camera. However, this is only an example and should not be construed as limiting. Alternatively, the zoom lens system is also applicable to a surveillance camera, a smartphone, and various other types of image capture devices.

(Schematic Configuration for Camera System to which First Embodiment is Applied)

Figure 10:
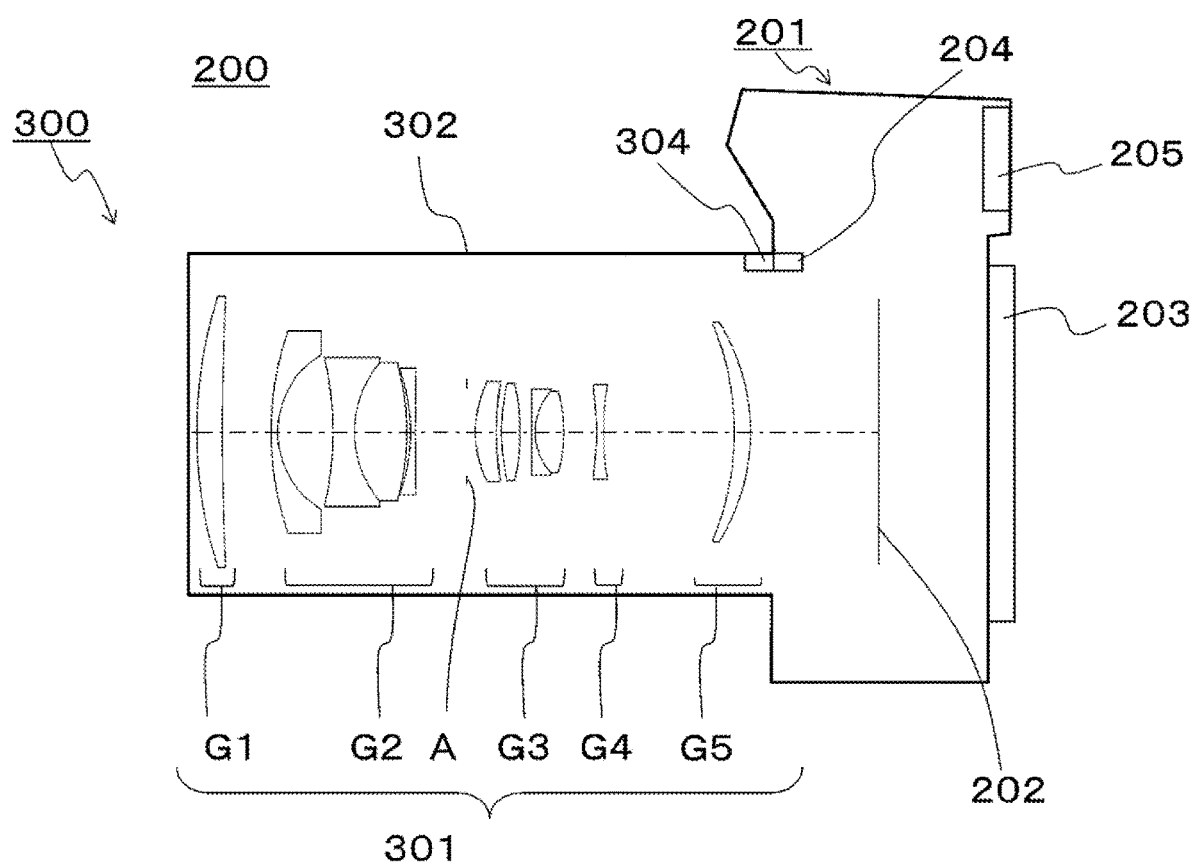
FIG. 10 illustrates a schematic configuration for a lens interchangeable digital camera according to the first embodiment.

FIG. 10 illustrates a schematic configuration for a camera system, to which the zoom lens system of the first embodiment is applied. Optionally, the zoom lens system according to the second, third, or fourth embodiment is also applicable to the camera system.

The camera system 200 includes a camera body 201 and an interchangeable lens unit 300 to be connected removably to the camera body 201.

The camera body 201 includes an image sensor 202, a monitor 203, a memory (not shown) to store an image signal, a camera mount 204, and a viewfinder 205. The image sensor 202 receives an optical image formed by the zoom lens system of the interchangeable lens unit 300 and transforms the optical image into an electrical image signal. The monitor 203 displays the image signal transformed by the image sensor 202.

The interchangeable lens unit 300 includes the first lens group G1, the second lens group G2, the third lens group G3, and the fourth lens group G4.

The third lens group G3 includes the aperture stop A.

The lens barrel 302 holds the respective lens groups and aperture stop A of the zoom lens system 101. The lens barrel 302 further includes a lens mount 304 to be connected to the camera mount 204 of the camera body 201.

The camera mount 204 and the lens mount 304 not only are physically connected together but also electrically connects together a controller (not shown) in the camera body 201 and a controller (not shown) in the interchangeable lens unit 300. That is to say, the camera mount 204 and the lens mount 304 serve as interfaces that allow the camera mount 204 and the lens mount 304 to exchange signals with each other.

The zoom lens system 101 is made up of the respective lens groups held by the lens barrel 302 and the camera body 201. In addition, an actuator, a lens frame, and other members to be controlled by the controller in the interchangeable lens unit 300 are arranged with respect to the zoom lens system 101 such that the intervals between the first lens group G1, the second lens group G2, the third lens group G3, and the fourth lens group G4 change while the zoom lens system 101 is zooming.

Other Embodiments

The first, second, third, and fourth embodiments have been described as exemplary embodiments of the present disclosure. Note that the embodiments described above are only examples of the present disclosure and should not be construed as limiting. Rather, each of these embodiments may be readily modified, replaced, combined with other embodiments, provided with some additional components, or partially omitted without departing from the scope of the present disclosure.

For example, in the first to fourth embodiments described above, the zoom lens system is supposed to be used in the entire zoom range. However, the zoom lens system does not have to be used in the entire zoom range. Alternatively, the zoom lens system may also be used selectively only in an extracted range where optical performance is ensured according to the desired zoom range. That is to say, the zoom lens system may also be used as a zoom lens system with lower zoom power than the zoom lens system to be described for the first, second, third, and fourth examples of numerical values. Optionally, the zoom lens system may also be used selectively as single-focus zoom lens system only at an extracted focal length where optical performance is ensured according to the desired zoom position.

Furthermore, in the first to fourth embodiments described above, each of the lens groups that form the zoom lens system is supposed to consist of only refractive lenses that deflect the incoming light ray through refraction (i.e., lenses of the type that deflect the incoming light ray at the interface between two media with mutually different refractive indices). However, this is only an example and should not be construed as limiting. Alternatively, each lens group may also include diffractive lenses that deflect the incoming light ray through diffraction, compound aspheric lenses as a combination of a glass lens and a resin layer with an aspheric shape, or refractive index distributed lenses that deflect the incoming light ray in accordance with the distribution of refractive indices in the medium. Among other things, a diffraction structure is suitably formed at the interface between two media with mutually different refractive indices in the refractive-diffractive hybrid lens, because the diffraction efficiency would depend on the wavelength much less heavily in that case. This provides a camera system in which various types of aberrations have been compensated for sufficiently.

EXAMPLES OF NUMERICAL VALUES

Next, exemplary sets of specific numerical values that were actually adopted in the zoom lens systems with the configurations according to the first, second, third, and fourth embodiments will be described. Note that in the tables showing these exemplary sets of numerical values, the length is expressed in millimeters (mm), the angle of view is expressed in degrees (°), r indicates the radius of curvature, d indicates the surface interval, nd indicates a refractive index with respect to a d-line, νd (also denoted as "vd") indicates an abbe number with respect to a d-line, and a surface with an asterisk (*) is an aspheric surface. The aspheric shape is defined by the following equation. Furthermore, in the exemplary sets of numerical values, the aperture diameter refers to an effective open aperture diameter at each zoom position:

$$Z = \frac{h^2/r}{1+\sqrt{1-(1+\kappa)(h/r)^2}} + \sum A_n h^n$$

where Z is the distance from a point on an aspheric surface, located at a height h measured from the optical axis, to a tangent plane defined with respect to the vertex of the aspheric surface, h is the height as measured from the optical axis, r is the radius of curvature of the vertex, κ is a conic constant, and An is an $n^{th}$ order aspheric surface coefficient.

FIGS. 2, 4, 6, and 8 are longitudinal aberration diagrams of the zoom lens systems according to the first, second, third, and fourth examples of numerical values in the infinity in-focus state.

In each longitudinal aberration diagram, portion (a) shows the longitudinal aberrations at the wide-angle end, portion (b) shows the longitudinal aberrations at the middle position, and portion (c) shows the longitudinal aberrations at the telephoto end. Each of portions (a), (b) and (c) of these longitudinal aberration diagrams shows spherical aberration (SA (mm)), astigmatism (AST (mm)), and distortion (DIS (%)) in this order from left to right. In each spherical aberration diagram, the ordinate indicates the F number (designated by "F" on the drawings), the solid curve indicates a characteristic in response to a d-line, the shorter dashed curve indicates a characteristic in response to an F-line, and the longer dashed curve indicates a characteristic in response to a C-line. In each astigmatism diagram, the ordinate indicates the image height (designated by "H" on the drawings), the solid curve indicates a characteristic with respect to a sagittal plane (designated by "s" on the drawings), and the dotted curve indicates a characteristic with respect to a meridional plane (designated by "m" on the drawings). Furthermore, in each distortion diagram, the ordinate indicates the image height (designated by "H" on the drawings).

First Example of Numerical Values

Following is a first exemplary set of numerical values for the zoom lens system corresponding to the first embodiment shown in FIG. 1. Specifically, as the first example of numerical values for the zoom lens system, surface data is shown in Table 1, aspheric surface data is shown in Table 2, and various types of data in the infinity in-focus state are shown in Tables 3A-3D:

TABLE 1

(Surface data)

| Surface No. | R | d | nd | vd |
|---|---|---|---|---|
| Object surface | ∞ | | | |
| 1 | 74.84740 | 4.23940 | 1.58913 | 61.3 |
| 2 | 452.24940 | Variable | | |
| 3 | 52.11420 | 1.10000 | 2.00100 | 29.1 |
| 4 | 14.91980 | 9.28310 | | |
| 5 | −54.18700 | 3.57500 | 1.59283 | 68.6 |
| 6 | 17.89520 | 8.74000 | 1.85883 | 30.0 |
| 7 | −40.02790 | 0.58660 | | |
| 8 | −30.76300 | 0.80000 | 1.83400 | 37.3 |
| 9 | 712.19010 | Variable | | |
| 10 (aperture) | ∞ | 1.40000 | | |
| 11* | 18.55340 | 3.54000 | 1.80998 | 40.9 |
| 12* | 66.99790 | 0.80100 | | |
| 13 | 35.59050 | 3.12660 | 1.49700 | 81.6 |
| 14 | −35.59050 | 1.87330 | | |
| 15 | ∞ | 0.60000 | 1.80610 | 33.3 |
| 16 | 10.22220 | 4.78460 | 1.49700 | 81.6 |
| 17 | −24.61990 | Variable | | |
| 18* | −27.55640 | 1.18330 | 1.58313 | 59.5 |
| 19* | 191.01580 | Variable | | |
| 20 | −47.04540 | 2.68430 | 1.92286 | 20.9 |
| 21 | −34.61320 | 21.45510 | | |
| 22 | ∞ | BF | | |
| Image plane | ∞ | | | |

TABLE 2

(Aspheric surface data)

11$^{th}$ surface

K = 0.00000E+00, A4 = −4.06579E−07, A6 = −1.51085E−07,
A8 = −1.30108E−10 A10 = 9.76551E−13, A12 = −2.89506E−13,
A14 = 0.00000E+00

12$^{th}$ surface

K = 0.00000E+00, A4 = 3.76357E−05, A6 = −2.51451E−07,
A8 = 2.94985E−09 A10 = −5.53880E−11, A12 = 0.00000E+00,
A14 = 0.00000E+00

18$^{th}$ surface

K = 0.00000E+00, A4 = 2.76685E−04, A6 = −4.52645E−06,
A8 = 5.61616E−08 A10 = −3.12569E−10, A12 = 4.54348E−13,
A14 = −3.13535E−15

19$^{th}$ surface

K = 0.00000E+00, A4 = 2.76186E−04, A6 = −3.93458E−06,
A8 = 2.41588E−08 A10 = 5.03343E−10, A12 = −1.15334E−11,
A14 = 6.90534E−14

(Various Types of Data in Infinity In-Focus State)

TABLE 3A (Various types of data)
Zoom ratio: 2.77006

| | Wide-Angle | Middle | Telephoto |
|---|---|---|---|
| Focal length | 20.8055 | 34.6275 | 57.6324 |
| F number | 3.55615 | 4.51096 | 5.81812 |
| Angle of view | 46.5161 | 31.8978 | 20.2227 |
| Image height | 19.6000 | 21.6330 | 21.6330 |
| Total lens length | 105.4858 | 113.7500 | 138.3881 |
| BF | 0.03558 | 0.02082 | 0.00594 |
| d2 | 0.5000 | 8.1168 | 22.5853 |
| d9 | 19.8796 | 8.5912 | 2.4765 |
| d17 | 3.3822 | 5.5637 | 6.8560 |
| d19 | 11.9161 | 21.6852 | 36.6921 |
| Entrance pupil position | 19.7053 | 27.4948 | 47.8453 |
| Exit pupil position | −55.7941 | −76.1658 | −116.1406 |
| Anterior principal point | 32.7574 | 46.3839 | 76.8802 |
| Posterior principal point | 84.6803 | 79.1225 | 80.7558 |

TABLE 3B (Data about single lens)

| Lens | Start surface | Focal length |
|---|---|---|
| 1 | 1 | 151.6126 |
| 2 | 3 | −21.1972 |
| 3 | 5 | −22.2809 |
| 4 | 6 | 15.4783 |
| 5 | 8 | −35.3414 |
| 6 | 11 | 30.6755 |
| 7 | 13 | 36.3354 |
| 8 | 15 | −12.6811 |
| 9 | 16 | 15.2278 |
| 10 | 18 | −41.2160 |
| 11 | 20 | 128.6035 |

TABLE 3C (Data about zoom lens group)

| Group | Start surface | Focal length | Lens configuration length | Anterior principal point | Posterior principal point |
|---|---|---|---|---|---|
| 1 | 1 | 151.61265 | 4.23940 | −0.52688 | 1.05583 |
| 2 | 3 | −19.41459 | 24.08470 | 1.68444 | 9.00760 |
| 3 | 10 | 21.25486 | 16.12550 | 3.23333 | 6.69454 |
| 4 | 18 | −41.21604 | 1.18330 | 0.09405 | 0.53139 |
| 5 | 20 | 128.60355 | 2.68430 | 4.78664 | 6.20602 |

TABLE 3D (Zoom power of zoom lens group)

| Group | Start surface | Wide-angle | Middle | Telephoto |
|---|---|---|---|---|
| 1 | 1 | 0.00000 | 0.00000 | 0.00000 |
| 2 | 3 | −0.15308 | −0.16286 | −0.18535 |
| 3 | 10 | −0.54054 | −0.75310 | −0.94277 |
| 4 | 18 | 1.92784 | 2.16438 | 2.52800 |
| 5 | 20 | 0.86028 | 0.86039 | 0.86051 |

Second Example of Numerical Values

Figure 4:
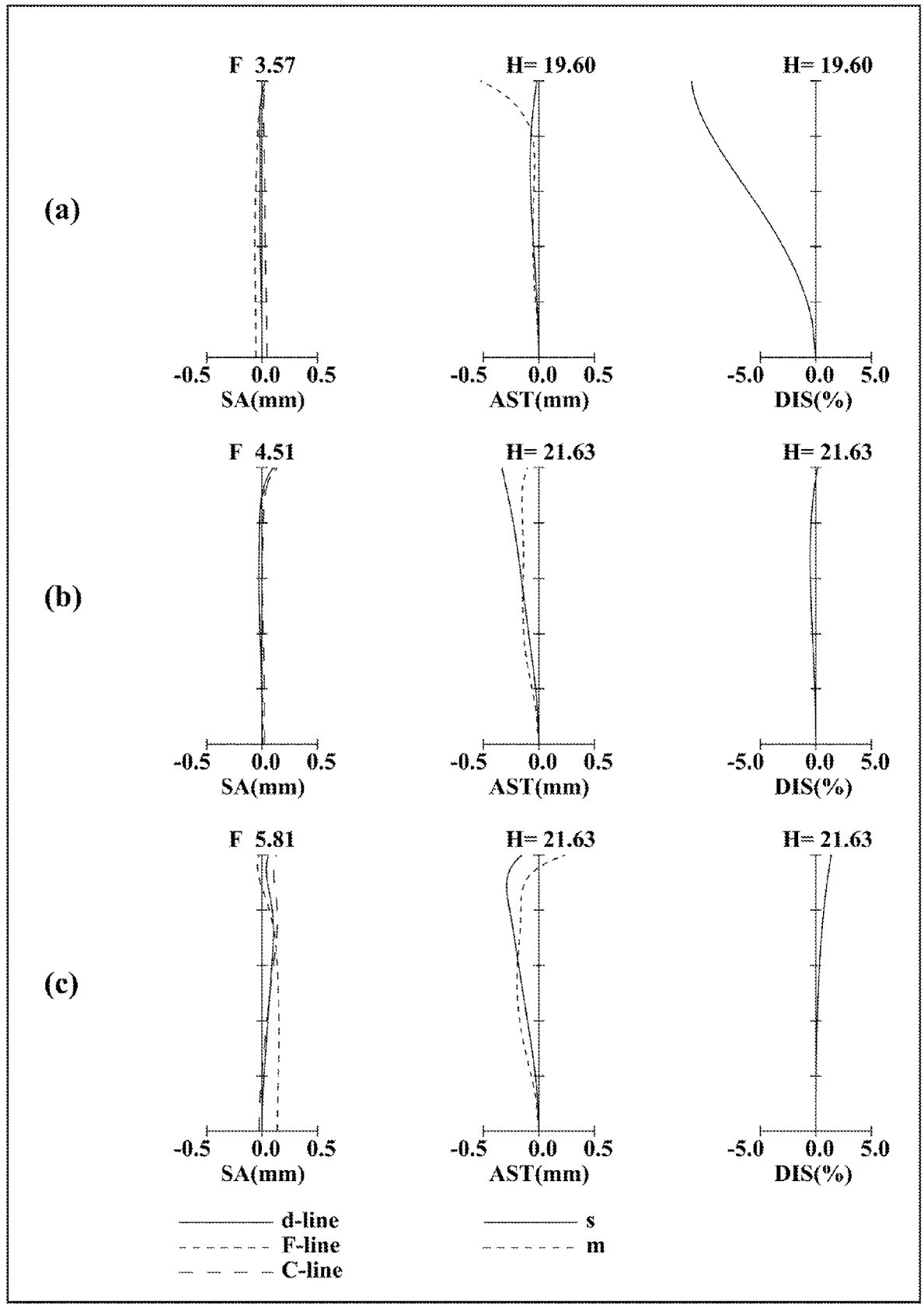
FIG. 4 illustrates longitudinal aberration diagrams showing what state the zoom lens system assumes at the infinity focus point in the second example of numerical values.

Following is a second exemplary set of numerical values for the zoom lens system corresponding to the second embodiment shown in FIG. 4. Specifically, as the second example of numerical values for the zoom lens system, surface data is shown in Table 4, aspheric surface data is shown in Table 5, and various types of data in the infinity in-focus state are shown in Tables 6A-6D:

TABLE 4

(Surface data)

| Surface No. | R | d | nd | vd |
|---|---|---|---|---|
| Object surface | ∞ | | | |
| 1 | 79.05120 | 3.98520 | 1.58913 | 61.3 |
| 2 | 433.29150 | Variable | | |
| 3 | 52.41620 | 1.10000 | 1.90366 | 31.3 |
| 4 | 14.38260 | 9.67620 | | |
| 5 | −53.53910 | 3.57500 | 1.59283 | 68.6 |
| 6 | 17.39800 | 8.74000 | 1.85883 | 30.0 |
| 7 | −37.41600 | 0.43080 | | |
| 8 | −31.68820 | 0.80000 | 1.85000 | 32.4 |
| 9 | 204.40240 | Variable | | |
| 10 (aperture) | ∞ | 1.40000 | | |
| 11* | 18.32080 | 3.54000 | 1.80998 | 40.9 |
| 12* | 67.32560 | 0.67340 | | |
| 13 | 36.38450 | 3.31500 | 1.49700 | 81.6 |
| 14 | −36.38450 | 1.83570 | | |
| 15 | ∞ | 0.60000 | 1.80610 | 33.3 |
| 16 | 10.24440 | 4.52350 | 1.49700 | 81.6 |
| 17 | −28.72800 | Variable | | |
| 18* | −33.62480 | 1.18690 | 1.58313 | 59.5 |
| 19* | 191.01580 | Variable | | |
| 20 | −44.49820 | 2.83020 | 1.92286 | 20.9 |
| 21 | −32.78720 | 22.19720 | | |
| 22 | ∞ | BF | | |
| Image plane | ∞ | | | |

TABLE 5

(Aspheric surface data)

$11^{th}$ surface

K = 0.00000E+00, A4 = 2.37925E−06, A6 = −2.08870E−07, A8 = 1.86643E−09 A10 = −1.36154E−11, A12 = −1.95074E−13, A14 = 0.00000E+00

$12^{th}$ surface

K = 0.00000E+00, A4 = 3.88512E−05, A6 = −2.93102E−07, A8 = 4.60572E−09 A10 = −5.77765E−11, A12 = 0.00000E+00, A14 = 0.00000E+00

$18^{th}$ surface

K = 0.00000E+00, A4 = 2.36793E−04, A6 = −3.87770E−06, A8 = 6.37251E−08 A10 = −7.56853E−10, A12 = 4.93569E−12, A14 = −8.49844E−15

$19^{th}$ surface

K = 0.00000E+00, A4 = 2.39528E−04, A6 = −3.14396E−06, A8 = 2.40725E−08 A10 = 2.59660E−10, A12 = −8.75404E−12, A14 = 6.41106E−14

(Various Types of Data in Infinity In-Focus State)

TABLE 6A (Various types of data)
Zoom ratio: 2.76998

| | Wide-Angle | Middle | Telephoto |
|---|---|---|---|
| Focal length | 20.8053 | 34.6272 | 57.6301 |
| F number | 3.57083 | 4.51102 | 5.80599 |
| Angle of view | 46.6920 | 31.9506 | 20.3158 |
| Image height | 19.6000 | 21.6330 | 21.6330 |
| Total lens length | 105.8668 | 114.3636 | 141.8544 |
| BF | 0.03347 | 0.03308 | 0.00531 |
| d2 | 0.5000 | 8.7066 | 25.4486 |
| d9 | 19.7087 | 8.3001 | 2.5274 |
| d17 | 2.9215 | 5.9516 | 7.2409 |
| d19 | 12.2940 | 20.9631 | 36.2231 |
| Entrance pupil position | 19.8090 | 28.1401 | 51.9522 |
| Exit pupil position | −57.8586 | −78.3415 | −122.6387 |
| Anterior principal point | 33.1372 | 47.4684 | 82.5020 |
| Posterior principal point | 85.0615 | 79.7364 | 84.2243 |

TABLE 6B (Data about single lens)

| Lens | Start surface | Focal length |
|---|---|---|
| 1 | 1 | 163.4455 |
| 2 | 3 | −22.2400 |
| 3 | 5 | −21.7420 |
| 4 | 6 | 14.9277 |
| 5 | 8 | −32.2264 |
| 6 | 11 | 30.1020 |
| 7 | 13 | 37.1664 |
| 8 | 15 | −12.7086 |
| 9 | 16 | 15.8033 |
| 10 | 18 | −48.9363 |
| 11 | 20 | 120.9631 |

TABLE 6C (Data about zoom lens group)

| Group | Start surface | Focal length | Lens configuration length | Anterior principal point | Posterior principal point |
|---|---|---|---|---|---|
| 1 | 1 | 163.44546 | 3.98520 | −0.55731 | 0.93052 |
| 2 | 3 | −19.67046 | 24.32200 | 2.02625 | 9.52239 |
| 3 | 10 | 21.88136 | 15.88760 | 2.48592 | 6.25975 |
| 4 | 18 | −48.93629 | 1.18690 | 0.11200 | 0.55064 |
| 5 | 20 | 120.96311 | 2.83020 | 5.01134 | 6.52264 |

TABLE 6D (Zoom power of zoom lens group)

| Group | Start surface | Wide-angle | Middle | Telephoto |
|---|---|---|---|---|
| 1 | 1 | 0.00000 | 0.00000 | 0.00000 |
| 2 | 3 | −0.14234 | −0.15133 | −0.17370 |
| 3 | 10 | −0.58221 | −0.83037 | −1.04104 |
| 4 | 18 | 1.81402 | 1.99116 | 2.30220 |
| 5 | 20 | 0.84674 | 0.84675 | 0.84698 |

Third Example of Numerical Values

Following is a third exemplary set of numerical values for the zoom lens system corresponding to the third embodiment shown in FIG. 7. Specifically, as the third example of numerical values for the zoom lens system, surface data is shown in Table 7, aspheric surface data is shown in Table 8, and various types of data in the infinity in-focus state are shown in Tables 9A-9D:

TABLE 7

(Surface data)

| Surface No. | R | d | nd | vd |
|---|---|---|---|---|
| Object surface | ∞ | | | |
| 1 | 103.76440 | 4.47440 | 1.59283 | 68.6 |
| 2 | 1198.19050 | Variable | | |
| 3 | 62.42650 | 1.10000 | 2.00100 | 29.1 |
| 4 | 14.32670 | 8.61070 | | |
| 5 | −54.98830 | 3.56130 | 1.59283 | 68.6 |
| 6 | 17.86910 | 8.69240 | 1.85883 | 30.0 |
| 7 | −178.48180 | 0.15240 | | |
| 8 | −177.07960 | 0.80000 | 1.83400 | 37.3 |
| 9 | 696.31500 | Variable | | |
| 10 (aperture) | ∞ | 1.40000 | | |
| 11* | 19.96330 | 3.45600 | 1.80998 | 40.9 |
| 12* | 56.36230 | 3.18350 | | |
| 13 | 29.58180 | 3.65300 | 1.49700 | 81.6 |
| 14 | −29.58180 | 2.08030 | | |
| 15 | ∞ | 0.60000 | 1.80610 | 33.3 |
| 16 | 10.07290 | 4.74740 | 1.49700 | 81.6 |
| 17 | −38.62090 | Variable | | |
| 18* | −38.74380 | 1.50000 | 1.58313 | 59.5 |
| 19* | 189.25840 | Variable | | |
| 20 | −38.94010 | 2.75140 | 2.00272 | 19.3 |
| 21 | −30.26760 | 20.00030 | | |
| 22 | ∞ | BF | | |
| Image plane | ∞ | | | |

TABLE 8

(Aspheric surface data)

$11^{th}$ surface

K = 0.00000E+00, A4 = 3.18014E−06, A6 = −7.23233E−08, A8 = −5.81701E−10 A10 = 1.23499E−12, A12 = −1.40720E−13, A14 = 0.00000E+00

$12^{th}$ surface

K = 0.00000E+00, A4 = 3.46601E−05, A6 = −3.47479E−08, A8 = −3.40482E−10 A10 = −1.62899E−11, A12 = 0.00000E+00, A14 = 0.00000E+00

$18^{th}$ surface

K = 0.00000E+00, A4 = 8.82062E−05, A6 = 8.52602E−09, A8 = −7.77333E−09 A10 = 4.03562E−11, A12 = 2.41659E−12, A14 = −2.15259E−14

$19^{th}$ surface

K = 0.00000E+00, A4 = 1.02270E−04, A6 = −4.92649E−07, A8 = 3.36192E−09 A10 = −1.03646E−10, A12 = 2.27915E−12, A14 = −1.34418E−14

(Various Types of Data in Infinity In-Focus State)

TABLE 9A (Various types of data)
Zoom ratio: 2.82112

| | Wide-Angle | Middle | Telephoto |
|---|---|---|---|
| Focal length | 18.7252 | 31.4517 | 52.8261 |
| F number | 3.59121 | 4.59215 | 5.94699 |
| Angle of view | 49.5276 | 34.4921 | 21.9000 |
| Image height | 19.3000 | 21.6330 | 21.6330 |
| Total lens length | 104.3172 | 111.3054 | 144.1573 |
| BF | 0.06723 | 0.00952 | 0.01193 |
| d2 | 0.5000 | 8.6531 | 30.9673 |
| d9 | 21.3171 | 8.3279 | 2.4958 |
| d17 | 6.1698 | 8.8509 | 8.5415 |
| d19 | 5.5000 | 14.7009 | 31.3777 |
| Entrance pupil position | 18.3270 | 25.9404 | 56.9192 |
| Exit pupil position | −51.3643 | −71.6340 | −117.1916 |
| Anterior principal point | 30.2347 | 43.5847 | 85.9355 |
| Posterior principal point | 85.5920 | 79.8538 | 91.3312 |

TABLE 9B (Data about single lens)

| Lens | Start surface | Focal length |
|---|---|---|
| 1 | 1 | 191.3376 |
| 2 | 3 | −18.7903 |
| 3 | 5 | −22.3430 |
| 4 | 6 | 19.3077 |
| 5 | 8 | −169.2063 |
| 6 | 11 | 36.6088 |
| 7 | 13 | 30.3833 |
| 8 | 15 | −12.4959 |
| 9 | 16 | 16.6127 |
| 10 | 18 | −55.0176 |
| 11 | 20 | 116.9567 |

TABLE 9C (Data about zoom lens group)

| Group | Start surface | Focal length | Lens configuration length | Anterior principal point | Posterior principal point |
|---|---|---|---|---|---|
| 1 | 1 | 191.33760 | 4.47440 | −0.26593 | 1.40364 |
| 2 | 3 | −21.26739 | 22.91680 | −0.40637 | 5.07847 |
| 3 | 10 | 24.10720 | 19.12020 | 2.89559 | 6.91500 |
| 4 | 18 | −55.01762 | 1.50000 | 0.16062 | 0.71542 |
| 5 | 20 | 116.95666 | 2.75140 | 5.32305 | 6.88894 |

TABLE 9D (Zoom power of zoom lens group)

| Group | Start surface | Wide-angle | Middle | Telephoto |
|---|---|---|---|---|
| 1 | 1 | 0.00000 | 0.00000 | 0.00000 |
| 2 | 3 | −0.12742 | −0.13397 | −0.15588 |
| 3 | 10 | −0.57506 | −0.82925 | −1.01697 |
| 4 | 18 | 1.54618 | 1.71201 | 2.01519 |
| 5 | 20 | 0.86380 | 0.86429 | 0.86427 |

Fourth Example of Numerical Values

Following is a fourth exemplary set of numerical values for the zoom lens system corresponding to the fourth embodiment shown in FIG. 10. Specifically, as the fourth example of numerical values for the zoom lens system, surface data is shown in Table 10, aspheric surface data is shown in Table 11, and various types of data in the infinity in-focus state are shown in Tables 12A-12D:

TABLE 10

(Surface data)

| Surface No. | R | d | nd | vd |
|---|---|---|---|---|
| Object surface | ∞ | | | |
| 1 | 69.82760 | 4.24680 | 1.58913 | 61.3 |
| 2 | 331.73010 | Variable | | |
| 3 | 53.60600 | 1.10000 | 2.00100 | 29.1 |
| 4 | 14.90110 | 9.25280 | | |
| 5 | −63.54280 | 3.57500 | 1.59283 | 68.6 |
| 6 | 17.86680 | 8.74000 | 1.85883 | 30.0 |
| 7 | −46.69850 | 0.46160 | | |
| 8 | −37.17410 | 0.80000 | 1.83400 | 37.3 |
| 9 | 311.06030 | Variable | | |
| 10 (aperture) | ∞ | 1.40000 | | |
| 11* | 18.56380 | 3.54000 | 1.80998 | 40.9 |
| 12* | 90.82990 | 1.85650 | | |
| 13 | 41.55670 | 3.23270 | 1.49700 | 81.6 |
| 14 | −41.55670 | 1.21840 | | |
| 15 | −1357.35920 | 0.60000 | 1.85000 | 32.4 |
| 16 | 9.81070 | 4.87600 | 1.59283 | 68.6 |
| 17 | −33.17120 | Variable | | |
| 18* | −27.43570 | 1.49480 | 1.58313 | 59.5 |
| 19* | 191.01580 | Variable | | |
| 20 | −47.86700 | 2.73870 | 1.92286 | 20.9 |
| 21 | −34.34710 | 22.05250 | | |
| 22 | ∞ | BF | | |
| Image plane | ∞ | | | |

TABLE 11

(Aspheric surface data)

$11^{th}$ surface

K = 0.00000E+00, A4 = 1.18770E−05, A6 = −1.36194E−07, A8 = 3.53360E−09 A10 = −4.08877E−12, A12 = −1.76149E−13, A14 = 0.00000E+00

$12^{th}$ surface

K = 0.00000E+00, A4 = 4.53798E−05, A6 = −2.77454E−07, A8 = 8.46457E−09 A10 = −5.88179E−11, A12 = 0.00000E+00, A14 = 0.00000E+00

$18^{th}$ surface

K = 0.00000E+00, A4 = 2.45719E−04, A6 = −4.54997E−06, A8 = 8.76814E−08 A10 = −1.13094E−09, A12 = 7.61020E−12, A14 = −1.04239E−14

$19^{th}$ surface

K = 0.00000E+00, A4 = 2.44105E−04, A6 = −3.68164E−06, A8 = 4.71067E−08 A10 = −2.84536E−10, A12 = −1.57769E−12, A14 = 2.48580E−14

(Various Types of Data in Infinity In-Focus State)

TABLE 12A (Various types of data)
Zoom ratio: 2.76996

| | Wide-Angle | Middle | Telephoto |
|---|---|---|---|
| Focal length | 20.8042 | 34.6249 | 57.6268 |
| F number | 3.50109 | 4.41409 | 5.65525 |
| Angle of view | 46.4451 | 31.8646 | 20.2816 |
| Image height | 19.6000 | 21.6330 | 21.6330 |
| Total lens length | 105.9183 | 114.1552 | 139.9733 |
| BF | 0.03767 | 0.02952 | −0.00648 |
| d2 | 0.5000 | 8.6233 | 24.1729 |
| d9 | 20.1234 | 8.4778 | 2.4597 |
| d17 | 3.0881 | 5.1340 | 5.8910 |
| d19 | 10.9833 | 20.7048 | 36.2704 |
| Entrance pupil position | 19.8383 | 28.2662 | 50.9252 |
| Exit pupil position | −55.8578 | −76.6433 | −120.1459 |
| Anterior principal point | 32.8992 | 47.2547 | 80.9104 |
| Posterior principal point | 85.1141 | 79.5304 | 82.3465 |

TABLE 12B (Data about single lens)

| Lens | Start surface | Focal length |
|---|---|---|
| 1 | 1 | 149.2310 |
| 2 | 3 | −20.9146 |
| 3 | 5 | −23.1457 |
| 4 | 6 | 16.0506 |
| 5 | 8 | −39.7735 |
| 6 | 11 | 28.1884 |
| 7 | 13 | 42.3547 |
| 8 | 15 | −11.4569 |
| 9 | 16 | 13.3347 |
| 10 | 18 | −41.0366 |
| 11 | 20 | 120.0945 |

TABLE 12C (Data about zoom lens group)

| Group | Start surface | Focal length | Lens configuration length | Anterior principal point | Posterior principal point |
|---|---|---|---|---|---|
| 1 | 1 | 149.23105 | 4.24680 | −0.70825 | 0.88211 |
| 2 | 3 | −20.12991 | 23.92940 | 1.33485 | 8.44068 |
| 3 | 10 | 21.45637 | 16.72360 | 3.41794 | 7.14990 |
| 4 | 18 | −41.03663 | 1.49480 | 0.11829 | 0.67125 |
| 5 | 20 | 120.09445 | 2.73870 | 4.59585 | 6.03646 |

TABLE 12D (Zoom power of zoom lens group)

| Group | Start surface | Wide-angle | Middle | Telephoto |
|---|---|---|---|---|
| 1 | 1 | 0.00000 | 0.00000 | 0.00000 |
| 2 | 3 | −0.16247 | −0.17387 | −0.20084 |
| 3 | 10 | −0.52366 | −0.72591 | −0.89094 |
| 4 | 18 | 1.94260 | 2.17922 | 2.55730 |
| 5 | 20 | 0.84352 | 0.84359 | 0.84389 |

(Values Corresponding to Inequalities)

Values, corresponding to the Inequalities (1) to (5), of the respective examples of numerical values are shown in the following Table 13:

TABLE 13

| | $1^{st}$ example of numerical values | $2^{nd}$ example of numerical values | $3^{rd}$ example of numerical values | $4^{th}$ example of numerical values |
|---|---|---|---|---|
| Inequality (1) | 68.6 | 68.6 | 68.6 | 68.6 |
| Inequality (2) | 2.00100 | 1.90366 | 2.00100 | 2.00100 |
| Inequality (3) | 81.6 | 81.6 | 81.6 | 81.6 |
| Inequality (4) | 0.72 | 0.85 | 1.04 | 0.71 |
| Inequality (5) | 0.85 | 0.74 | 0.61 | 0.80 |
| Inequality (6) | 1.92286 | 1.92286 | 2.00272 | 1.92286 |
| Inequality (7) | −6.57 | −6.60 | −7.98 | −6.08 |

INDUSTRIAL APPLICABILITY

The zoom lens system according to the present disclosure is applicable to various types of cameras including digital still cameras, digital cameras, of which the lens is interchangeable, digital camcorders, cameras for cellphones and smartphones, and cameras for personal digital assistants (PDAs), surveillance cameras for surveillance systems, Web cameras, and onboard cameras. Among other things, the present disclosure is particularly suitably applicable as a zoom lens system for digital still camera systems, digital camcorder systems, and other camera systems that require high image quality.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A zoom lens system comprising:
   a first lens group having positive power;
   a second lens group having negative power;
   a third lens group having positive power;
   a fourth lens group having negative power; and
   a fifth lens group having positive power,
   wherein:
   the first, second, third, fourth, and fifth lens groups are arranged in this order such that: (i) the first lens group is configured to be closer to an object than any of the second, third, fourth or fifth lens groups; and (ii) the fifth lens group is configured to be closer to an image than any of the first, second, third, or fourth lens groups;
   the first lens group consists of a single positive meniscus lens which is adjacent to the second lens group;
   the second lens group is comprised of four lenses; and
   the zoom lens system is configured to zoom from a wide-angle end toward a telephoto end such that the fifth lens group does not move but the first, second, third, and fourth lens groups move to change intervals between all of the first, second, third, fourth, and fifth lens groups.

2. The zoom lens system of claim 1, wherein
   the second lens group includes a negative lens L2d which is configured to be closest to the image of any lens of the second lens group.

3. The zoom lens system of claim 2, wherein the second lens group is comprised of:
   a negative lens L2a;
   a negative lens L2b;
   a positive lens L2c; and
   the negative lens L2d,
   wherein the negative lens L2a, the negative lens L2b, the positive lens L2c, and the negative lens L2d are arranged in this order such that: (i) the negative lens L2a is configured to be closer to the object than any of the negative lens L2b, the positive lens L2c, or the negative lens L2d; and (ii) the negative lens L2d is configured to be closer to the image than any of the negative lens L2a, the negative lens L2b, or the positive lens L2c.

4. The zoom lens system of claim 3, wherein:
   the zoom lens system satisfies vL2b>62; and
   vL2b is an abbe number with respect to a d-line of the negative lens L2b.

5. The zoom lens system of claim 1, wherein:
   the second lens group includes a negative lens L2a which is configured to be closest to the image of any lens of the second lens group;
   the zoom lens system satisfies nL2a>1.9; and
   nL2a is a refractive index with respect to a d-line of the negative lens L2a.

6. The zoom lens system of claim 1, wherein the third lens group is comprised of:
   a positive lens L3a;
   a positive lens L3b;
   a negative lens L3c; and
   a positive lens L3d,
   wherein:
   the positive lens L3a, the positive lens L3b, the negative lens L3c, and the positive lens L3d are arranged in this order such that: (i) the positive lens L3a is configured to be closer to the object than any of the positive lens L3b, the negative lens L3c, or the positive lens L3d; and (ii) the positive lens L3d is configured to be closer to the image than any of the positive lens L3*a*, the positive lens L3*b*, or the negative lens L3*c*;

the zoom lens system satisfies vL3*d*>62; and vL3*d* is an abbe number with respect to a d-line of the positive lens L3*d*.

7. The zoom lens system of claim 1, wherein:

the zoom lens system satisfies 0.5<|f4/fT|<1.1; and f4 is a focal length of the fourth lens group and fT is a focal length of an entirety of the zoom lens system at the telephoto end.

8. The zoom lens system of claim 1, wherein:

the zoom lens system satisfies 0.5<f5/f1<1.0; and f1 is a focal length of the first lens group and f5 is a focal length of the fifth lens group.

9. The zoom lens system of claim 1, wherein:

the fifth lens group is comprised of a single lens L5*a*;

the zoom lens system satisfies 1.8<nL5*a*; and nL5*a* is a refractive index with respect to a d-line of the single lens L5*a*.

10. The zoom lens system of claim 1, wherein:

the fifth lens group is comprised of a single lens L5*a*;

the zoom lens system satisfies −8.5<(L5*a*R1+L5*a*R2)/(L5*a*R2−L5*a*R1);

L5*a*R1 is a radius of curvature of a first surface, configured to face the object, of the single lens L5*a*; and L5*a*R2 is a radius of curvature of a second surface, configured to face the image, of the single lens L5*a*.

11. A camera system comprising:

an interchangeable lens unit including the zoom lens system of claim 1; and a camera body configured to be removably connected to the interchangeable lens unit via a camera mount and including an image sensor configured to: (i) receive an optical image of the object formed by the zoom lens system; and iii) transform the optical image into an electrical image signal, wherein the interchangeable lens unit is configured to form the optical image on the image sensor.

12. An image capture device configured to transform an optical image of an object into an electrical image signal and display or store the electrical image signal, the image capture device comprising:

the zoom lens system of claim 1 which is configured to form the optical image; and an image sensor configured to transform the optical image into the electrical image signal.

* * * * *